US012142207B2

(12) United States Patent
Gao et al.

(10) Patent No.: US 12,142,207 B2
(45) Date of Patent: Nov. 12, 2024

(54) CONFIGURABLE PIXEL UNIFORMITY COMPENSATION FOR OLED DISPLAY NON-UNIFORMITY COMPENSATION BASED ON SCALING FACTORS

(71) Applicant: Apple Inc., Cupertino, CA (US)

(72) Inventors: Shengkui Gao, San Jose, CA (US); Haifeng Li, Campbell, CA (US); Sinan Alousi, Campbell, CA (US); Marc Joseph DeVincentis, Palo Alto, CA (US); Yafei Bi, Los Altos Hills, CA (US); Hung Sheng Lin, San Jose, CA (US); Yi Qiao, San Jose, CA (US); Paolo Sacchetto, Cupertino, CA (US); Weijun Yao, Saratoga, CA (US); Pierre-Yves Emelie, Mountain View, CA (US); Maofeng Yang, Santa Clara, CA (US); Yue Jack Chu, Cupertino, CA (US)

(73) Assignee: Apple, Inc., Cupertino, CA (US)

( * ) Notice: Subject to any disclaimer, the term of this patent is extended or adjusted under 35 U.S.C. 154(b) by 221 days.

(21) Appl. No.: 17/191,009

(22) Filed: Mar. 3, 2021

(65) Prior Publication Data

US 2021/0304673 A1 Sep. 30, 2021

Related U.S. Application Data

(60) Provisional application No. 63/003,040, filed on Mar. 31, 2020.

(51) Int. Cl.
*G09G 3/3233* (2016.01)

(52) U.S. Cl.
CPC ... *G09G 3/3233* (2013.01); *G09G 2320/0209* (2013.01); *G09G 2320/0233* (2013.01);
(Continued)

(58) Field of Classification Search
CPC ......... G09G 3/3233; G09G 2320/0209; G09G 2320/0233; G09G 2320/041;
(Continued)

(56) References Cited

U.S. PATENT DOCUMENTS 8,058,808 B2 11/2011 Hong et al.
8,665,295 B2 * 3/2014 Leon .................... G09G 3/3233 345/690

(Continued)

FOREIGN PATENT DOCUMENTS

CN 102663976 A 9/2012
CN 107731169 A 2/2018

(Continued)

OTHER PUBLICATIONS

Examination Report for Indian Patent Application No. 202114014408 dated Feb. 15, 2022; 7 pgs.

(Continued)

*Primary Examiner* — Jeff Piziali
(74) *Attorney, Agent, or Firm* — Fletcher Yoder, P.C.

(57) ABSTRACT

A system may include an electronic display panel having pixels, where each pixel may emit light based on a respective programming signal. The system may include a memory storing a map. The processing circuitry may determine a function for each pixel from the map. The processing circuitry may determine a respective control signal based on the function and a target brightness level for each pixel to generate multiple control signals, where the respective control signal is used to generate the respective programming signal for each pixel. The processing circuitry may determine a scaling factor based at least in part on the first map and may scale at least a subset of the multiple control signals based at least in part on the scaling factor.

11 Claims, 20 Drawing Sheets

(52) U.S. Cl.
CPC ................. *G09G 2320/041* (2013.01); *G09G 2320/0646* (2013.01)

(58) Field of Classification Search
CPC ... G09G 2320/0646; G09G 2320/0271; G09G 2320/0295; G09G 2320/045; G09G 2320/0693; G09G 3/3225; G09G 3/3208
See application file for complete search history.

(56) References Cited

U.S. PATENT DOCUMENTS

| | | | | |
|---|---|---|---|---|
| 9,202,412 | B2 * | 12/2015 | Odawara | G09G 3/3233 |
| 9,236,011 | B2 | 12/2016 | Mizukoshi | |
| 9,513,169 | B2 | 12/2016 | Ohnishi et al. | |
| 9,711,092 | B2 * | 7/2017 | Kishi | G09G 3/3291 |
| 9,812,071 | B2 | 11/2017 | Matsui | |
| 9,947,293 | B2 * | 4/2018 | Chaji | G09G 3/3225 |
| 10,311,780 | B2 * | 6/2019 | Chaji | G09G 3/3225 |
| 10,726,790 | B2 | 7/2020 | Shi | |
| 10,984,713 | B1 | 4/2021 | Tan et al. | |
| 11,200,867 | B1 | 12/2021 | Yang et al. | |
| 11,205,378 | B1 | 12/2021 | Yang et al. | |
| 2006/0262147 | A1 | 11/2006 | Kimpe et al. | |
| 2007/0290958 | A1 * | 12/2007 | Cok | G09G 3/3225 345/77 |
| 2009/0102749 | A1 | 4/2009 | Kawabe | |
| 2009/0160740 | A1 | 6/2009 | Leon et al. | |
| 2009/0224016 | A1 | 9/2009 | Stautzenberger, Sr. | |
| 2009/0225016 | A1 | 9/2009 | Lai et al. | |
| 2010/0103082 | A1 | 4/2010 | Levey et al. | |
| 2010/0103159 | A1 | 4/2010 | Leon | |
| 2010/0123699 | A1 | 5/2010 | Leon et al. | |
| 2010/0225630 | A1 | 9/2010 | Levey et al. | |
| 2010/0225634 | A1 | 9/2010 | Levey et al. | |
| 2010/0238356 | A1 | 9/2010 | Kida et al. | |
| 2011/0069061 | A1 | 3/2011 | Nakamura | |
| 2011/0227505 | A1 | 9/2011 | Park et al. | |
| 2012/0056916 | A1 | 3/2012 | Ryu et al. | |
| 2013/0027383 | A1 | 1/2013 | Odawara et al. | |
| 2013/0278578 | A1 | 10/2013 | Vetsuypens et al. | |
| 2014/0111567 | A1 * | 4/2014 | Nathan | G09G 3/3233 345/694 |
| 2014/0239846 | A1 | 8/2014 | Shoji et al. | |
| 2014/0354711 | A1 | 12/2014 | In et al. | |
| 2014/0375704 | A1 | 12/2014 | Bi et al. | |
| 2015/0339977 | A1 | 11/2015 | Nathan et al. | |
| 2016/0035281 | A1 | 2/2016 | Jeon et al. | |
| 2016/0086548 | A1 | 3/2016 | Maeyama | |
| 2017/0039953 | A1 | 2/2017 | Lee | |
| 2017/0122725 | A1 | 5/2017 | Yeoh et al. | |
| 2017/0132977 | A1 | 5/2017 | Kim | |
| 2017/0243548 | A1 * | 8/2017 | Wang | G09G 3/20 |
| 2017/0287390 | A1 | 10/2017 | Lee et al. | |
| 2017/0365202 | A1 | 12/2017 | Lin et al. | |
| 2018/0075798 | A1 | 3/2018 | Nho et al. | |
| 2018/0077314 | A1 | 3/2018 | Nishi | |
| 2018/0090109 | A1 | 3/2018 | Lin et al. | |
| 2018/0130423 | A1 | 5/2018 | Kim et al. | |
| 2018/0137819 | A1 | 5/2018 | An et al. | |
| 2018/0137825 | A1 | 5/2018 | An et al. | |
| 2018/0151112 | A1 | 5/2018 | Song et al. | |
| 2018/0151124 | A1 | 5/2018 | An et al. | |
| 2018/0182303 | A1 | 6/2018 | Jung et al. | |
| 2018/0246375 | A1 | 8/2018 | Zhang | |
| 2018/0261157 | A1 | 9/2018 | Chaji et al. | |
| 2018/0336822 | A1 | 11/2018 | Yan et al. | |
| 2018/0366074 | A1 | 12/2018 | Choi et al. | |
| 2019/0066555 | A1 | 2/2019 | Gu et al. | |
| 2019/0080666 | A1 | 3/2019 | Chappalli et al. | |
| 2019/0147781 | A1 | 5/2019 | Park | |
| 2019/0156717 | A1 | 5/2019 | Moradi et al. | |
| 2019/0156718 | A1 | 5/2019 | Moradi et al. | |
| 2019/0340980 | A1 | 11/2019 | Yum et al. | |
| 2020/0058252 | A1 | 2/2020 | Kim et al. | |
| 2020/0184912 | A1 | 6/2020 | Wang | |

FOREIGN PATENT DOCUMENTS

| | | | |
|---|---|---|---|
| CN | 109427300 | A | 3/2019 |
| CN | 109474769 | A | 3/2019 |
| EP | 2453433 | A2 | 5/2012 |
| KR | 20080011883 | A | 2/2008 |

OTHER PUBLICATIONS

Office Action for Chinese Patent Application No. 202110320024.5 dated Mar. 25, 2024; 8 pgs.
Notice of Grant for Chinese Patent Application No. 202110320024.5 dated Aug. 22, 2024; 4 pgs.

* cited by examiner

CONFIGURABLE PIXEL UNIFORMITY COMPENSATION FOR OLED DISPLAY NON-UNIFORMITY COMPENSATION BASED ON SCALING FACTORS

CROSS-REFERENCE TO RELATED APPLICATIONS

This application is a non-provisional application claiming priority to U.S. Provisional Application No. 63/003,040, entitled "CONFIGURABLE PIXEL UNIFORMITY COMPENSATION FOR OLED DISPLAY NON-UNIFORMITY COMPENSATION BASED ON SCALING FACTORS," filed Mar. 31, 2020, which is hereby incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to compensating for non-uniform properties of pixels of an electronic display using a function derived in part by measuring light emitted by a pixel. Electronic displays are found in numerous electronic devices, from mobile phones to computers, televisions, automobile dashboards, and many more. Individual pixels of the electronic display may collectively produce images by permitting different amounts of light to be emitted from each pixel. This may occur by self-emission as in the case of light-emitting diodes (LEDs), such as organic light-emitting diodes (OLEDs), or by selectively providing light from another light source as in the case of a digital micromirror device (DMD) or liquid crystal display (LCD). These electronic displays sometimes do not emit light equally between pixels or groups of pixels of the electronic display. This may be due at least in part to non-uniform properties associated with the pixels caused by differences in component age, operating temperatures, material properties of pixel components, and the like. The non-uniform properties between pixels and/or portions of the electronic display may manifest as visual artifacts since different pixels and/or portions of the electronic display emit visibly different (e.g., perceivable by a user) amounts of light.

Systems and methods that compensate for non-uniform properties between pixels or groups of pixels of an electronic display may substantially improve the visual appearance of an electronic display by reducing perceivable visual artifacts. The systems to perform the compensation may be external to an electronic display and/or an active area of the electronic display, in which case they may be understood to provide a form of external compensation, or the systems to perform the compensation may be located within the electronic display (e.g., in a display driver integrated circuit). The compensation may take place in a digital domain or an analog domain. The net result of the compensation may produce a compensated data signal (e.g., programming voltage, programming current) transmitted to each pixel of the electronic display before the data signal is used to cause the pixel to emit light. Because the compensated data signal is compensated to account for the non-uniform properties of the pixels, images resulting from transmitting compensated data signals to the pixels may have substantially reduced visual artifacts. In this way, visual artifacts due to non-uniform properties of the pixels may be reduced or eliminated.

Indeed, this disclosure describes compensation techniques that use a per-pixel or per-group-of-pixels function to leverage a relatively small number of variables to predict a brightness-to-data relationship. In this disclosure, the brightness-to-data relationship is generally referred to a brightness-to-voltage (Lv-V) relationship, which is the case when the data signal is a voltage signal. However, the brightness-to-data relationship may also be used when the data signal represents a current (e.g., a brightness-to-current relationship (Lv-I)) or a power (e.g., a brightness-to-power relationship (Lv-W)). It should be appreciated that further references to brightness-to-voltage (Lv-V) are intended to also apply to any suitable brightness-to-data relationship, such as a brightness-to-current relationship (Lv-I), brightness-to-power relationship (Lv-W), or the like. The predicted brightness-to-data relationship may be expressed as a curve, which may facilitate determining the appropriate data signal to transmit to the pixel to cause emission at a target brightness level of light. In addition, some examples may include a regional or global adjustment to further correct non-uniformities of the electronic display.

A controller may apply the brightness-to-data relationship of a pixel or group of pixels to improve perceivable visual appearances of the electronic display by changing a data signal (e.g., programming signal) used to drive that pixel or by changing the data signals used to drive that group of pixels. In this way, the brightness-to-data relationship may change a data signal itself and/or a gray level of image data before being sent to a display. The data signal may be a programming signal (e.g., programming voltage, a programming current, a signal used to program a pixel to emit light). In this way, programming signals may be signals that are used to drive a light-emitting portion of the pixel directly to emit light and/or used to control operation of a pixel to emit light. In some cases, compensation operations may be performed to programming signals that are used to generate compensated programming voltages and/or compensated programming currents and/or control signals for light emission. In other cases, compensation operations may adjust target gray levels or binary data used to drive pixels to emit light. Regardless of the data signal, however, the brightness-to-data relationship may help to reduce or eliminate perceivable non-uniformity between pixels or groups of pixels.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
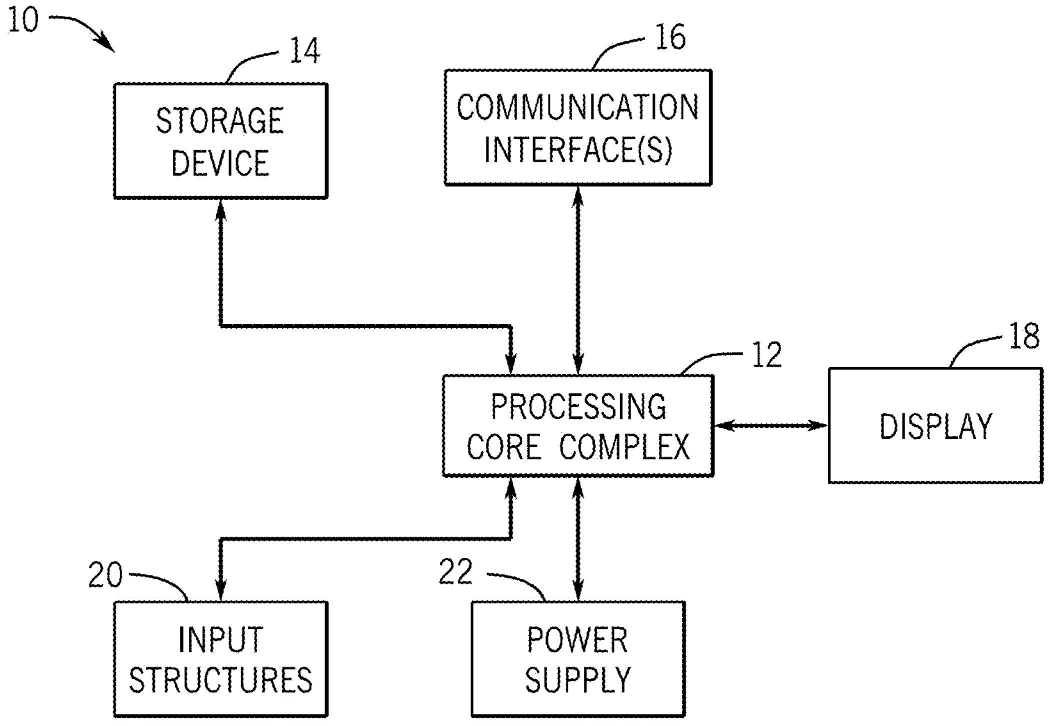
FIG. 1 is a schematic block diagram of an electronic device, in accordance with an embodiment.

One or more specific embodiments are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B. Embodiments of the present disclosure relate to systems and methods that compensate non-uniform properties between pixels of an electronic display to improve perceived appearance of the display to reduce or eliminate visual artifacts. Electronic displays may include light-modulating pixels, which may be light-emitting in the case of light-emitting diode (LEDs), such as organic light-emitting diodes (OLEDs), but may selectively provide light from another light source as in the case of a digital micromirror device (DMD) or liquid crystal display (LCD). While this disclosure generally refers to self-emissive displays, it should be appreciated that the systems and methods of this disclosure may also apply to other forms of electronic displays that have non-uniform properties of pixels causing varying brightness versus voltage relationships (Lv-V curves), and should not be limited to self-emissive displays. When the electronic display is a self-emissive display, an OLED represents one type of LED that may be found in a self-emissive pixel, but other types of LEDs may also be used.

The systems and methods of this disclosure may compensate for non-uniform properties between pixels. This may improve the visual appearance of images on the electronic display. The systems and methods may also improve a response by the electronic display to changes in operating conditions, such as temperature, by enabling a controller to accurately predict performance of individual pixels of the electronic display without tracking and recording numerous data points of pixel behavior to determine Lv-V curves. Instead, a controller may store a few variables, or extracted parameters, for each pixel or group of pixels that, when used in a function (e.g., per-pixel function or per-region function, per-group-of-pixels functions), may generally produce the Lv-V curve of each respective pixel. This reduces a reliance on large numbers of stored data points for all of the pixels of the electronic display, saving memory and/or computing or processing resources. In addition to the controller using a relatively small number of per-pixel or per-region variables, some embodiments may include a further compensation may be applied on a regional or global basis. By at least using the per-pixel function, the Lv-V curves for each pixel in the electronic display may be estimated without relying on large amounts of stored test data. Using the estimated Lv-V curves defined by the per-pixel function, image data that is to be displayed on the electronic display may be compensated before it is programmed into each pixel. The resulting images may have reduced or eliminated visual artifacts due to Lv-V non-uniformities among the pixels.

Furthermore, in some examples, a map used to generate each per-pixel function may be created at a particular brightness level of the display. For example, the map may be generated during manufacturing of the electronic device as part of a display calibration operation and may include data corresponding to one or more captured images. To generate the map, image capturing devices may capture an image of the display at a particular brightness level. In some cases, pixels of the display may have different behaviors at different brightness levels of the display. In these cases, per-pixel functions that result from the generated map may be optimally applied at particular brightness levels and less optimally applied not at the particular brightness level or at a brightness level not within a range of deviation from the particular brightness level. As will be appreciated, generating several maps at different brightness levels during calibration and selecting which map to reference to obtain relevant per-pixel functions may improve compensation operations of the electronic device. For example, a particular map may be selected from a group of maps in response to real-time operating conditions of the display (e.g., an input brightness value, global brightness value affecting the whole display), and be used to derive per-pixel functions associated with the real-time operating condition. Improvements to compensation operations may improve an appearance of the display, such as by making the display appear relatively more uniform.

In some cases, a physical design of a display may introduce crosstalk between regions of the display that effects how an image frame is presented on the display. Crystalline structures of silicon and/or semiconductor wafers used to support circuitry of the display may cause regional differences in presentation and/or driving of the pixels. Crosstalk may correspond to when signals used to drive one portion of the display affect driving of another portion of the display. Crosstalk may affect the display at a variety of granularities, including, for example, at a pixel-level, a regional-level, a component-level, or the like. For example, the crosstalk may affect the display due at least in part to the physical arrangement of pixels, physical placement or layout of channels for delivery of signals to the pixels, heat-generating components of the electronic device, or the like. To compensate for effects of crosstalk, additional scaling may be performed to per-pixel functions used to determine driving signals of the display before using the signals to drive pixels of the display. This may permit signals to a portion of the display that are undesirably affecting another portion of the display to be scaled down to reduce crosstalk between the portions.

In this way, additional processing may be performed to a selected map before using the selected map to adjust input data, where the selected map includes indications of each per-pixel function defined for the panel. For example, the selected map may be scaled based on previous input data, such as to compensate for inter-device crosstalk. By scaling the selected map based on a previous input data value, any lingering signals associated with compensation and/or using the previous input data value to drive a corresponding pixel may be compensated (e.g., filtered out). These compensation processes may reduce crosstalk, such as inter-symbol interferences, residual after transmission of the previous input data through processing circuitry of the display.

In some cases, the processing circuitry may use other scaling parameters to further scale input data. For example, a refresh rate scaling parameter and/or a temperature scaling parameter may be use by the processing circuitry to adjust the input data. The additional scaling parameters may be used alone or in combination with the scaling based on the previous input data. Furthermore, in some embodiments, a memory storing the maps may use a different data width than couplings used to transmit data between processing operations of the processing circuitry. Thus, the processing circuitry may additionally or alternatively include up-sampling circuitry to change a data width and/or a representation of the selected map prior to using the map to adjust the input data.

A general description of suitable electronic devices that may include an electronic display, which may be a self-emissive display, such as a LED (e.g., an OLED) display, and corresponding circuitry of this disclosure are provided. FIG. 1 is a block diagram of one example of a suitable electronic device 10 may include, among other things, a processing core complex 12 such as a system on a chip (SoC) and/or processing circuit(s), a storage device 14, communication interface(s) 16, a display 18, input structures 20, and a power supply 22. The blocks shown in FIG. 1 may each represent hardware, software, or a combination of both hardware and software. The electronic device 10 may include more or fewer elements. It should be appreciated that FIG. 1 merely provides one example of a particular implementation of the electronic device 10.

The processing core complex 12 of the electronic device 10 may perform various data processing operations, including generating and/or processing image data for presentation on the display 18, in combination with the storage device 14. For example, instructions that are executed by the processing core complex 12 may be stored on the storage device 14. The storage device 14 may be volatile and/or non-volatile memory. By way of example, the storage device 14 may include random-access memory, read-only memory, flash memory, a hard drive, and so forth.

The electronic device 10 may use the communication interface(s) 16 to communicate with various other electronic devices or elements. The communication interface(s) 16 may include input/output (I/O) interfaces and/or network interfaces. Such network interfaces may include those for a personal area network (PAN) such as Bluetooth, a local area network (LAN) or wireless local area network (WLAN) such as Wi-Fi, and/or for a wide area network (WAN) such as a cellular network.

Using pixels (e.g., pixels containing LEDs, such as OLEDs), the display 18 may show images generated by the processing core complex 12. The display 18 may include touchscreen functionality for users to interact with a user interface appearing on the display 18. Input structures 20 may also enable a user to interact with the electronic device 10. In some examples, the input structures 20 may represent hardware buttons, which may include volume buttons or a hardware keypad. The power supply 22 may include any suitable source of power for the electronic device 10. This may include a battery within the electronic device 10 and/or a power conversion device to accept alternating current (AC) power from a power outlet.

Figure 2:
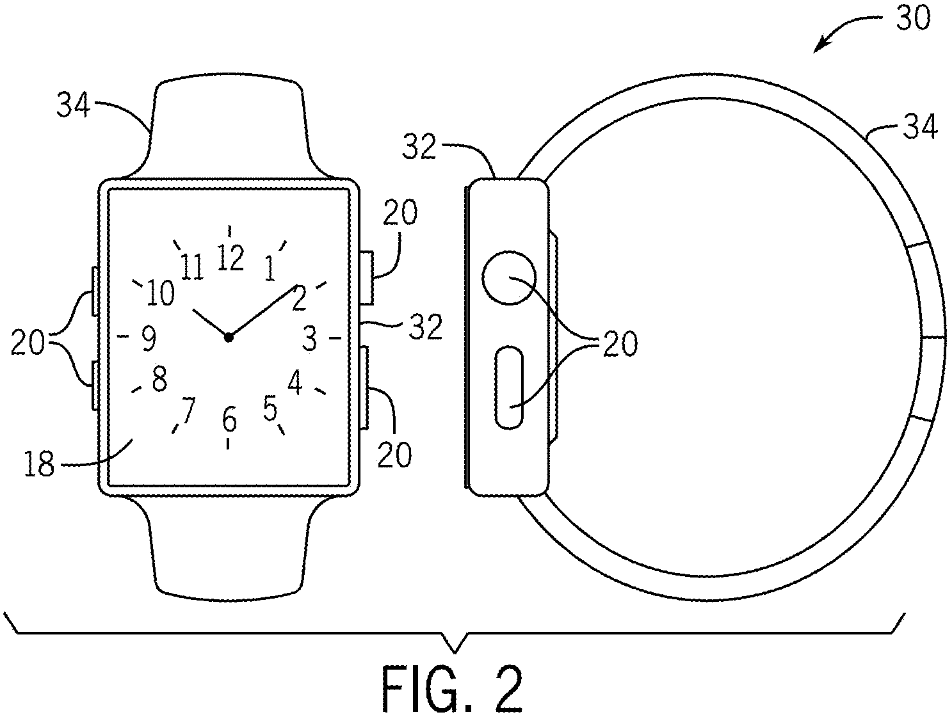
FIG. 2 is a perspective view of a watch representing an embodiment of the electronic device of FIG. 1, in accordance with an embodiment.

As may be appreciated, the electronic device 10 may take a number of different forms. As shown in FIG. 2, the electronic device 10 may take the form of a watch 30. For illustrative purposes, the watch 30 may be any Apple Watch® model available from Apple Inc. The watch 30 may include an enclosure 32 that houses the electronic device 10 elements of the watch 30. A strap 34 may enable the watch 30 to be worn on the arm or wrist. The display 18 may display information related to the watch 30 operation, such as the time. Input structures 20 may enable a person wearing the watch 30 to navigate a graphical user interface (GUI) on the display 18.

Figure 3:
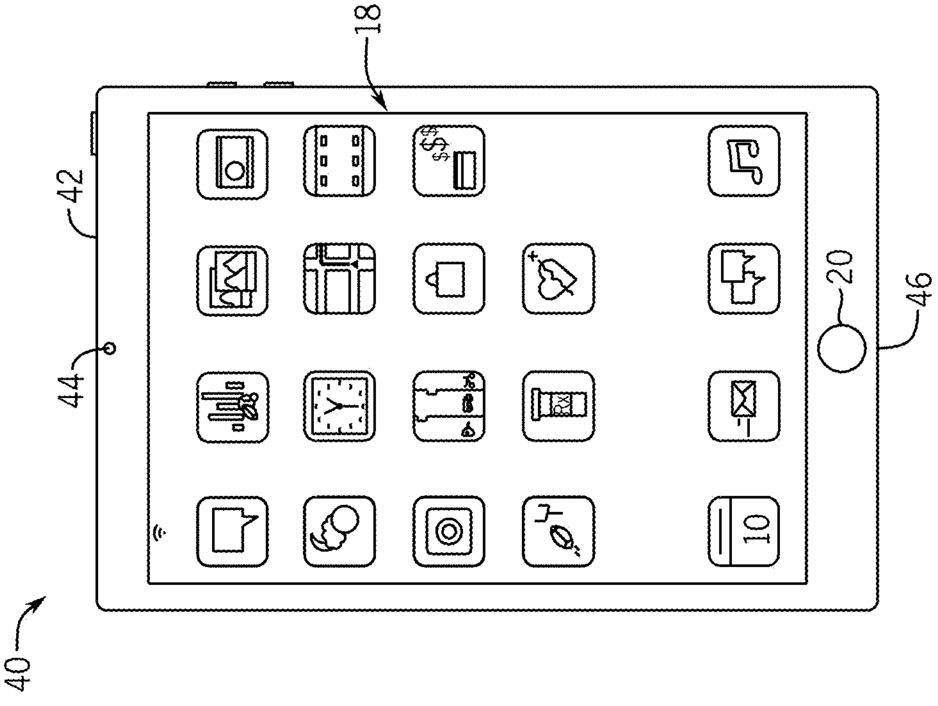
FIG. 3 is a front view of a tablet device representing an embodiment of the electronic device of FIG. 1, in accordance with an embodiment.

The electronic device 10 may also take the form of a tablet device 40, as is shown in FIG. 3. For illustrative purposes, the tablet device 40 may be any iPad® model available from Apple Inc. Depending on the size of the tablet device 40, the tablet device 40 may serve as a handheld device such as a mobile phone. The tablet device 40 includes an enclosure 42 through which input structures 20 may protrude. In certain examples, the input structures 20 may include a hardware keypad (not shown). The enclosure 42 also holds the display 18. The input structures 20 may enable a user to interact with a GUI of the tablet device 40. For example, the input structures 20 may enable a user to type a Rich Communication Service (RCS) message, a Short Message Service (SMS) message, or make a telephone call. A speaker 44 may output a received audio signal and a microphone 46 may capture the voice of the user. The tablet device 40 may also include a communication interface 16 to enable the tablet device 40 to connect via a wired connection to another electronic device.

Figure 4:
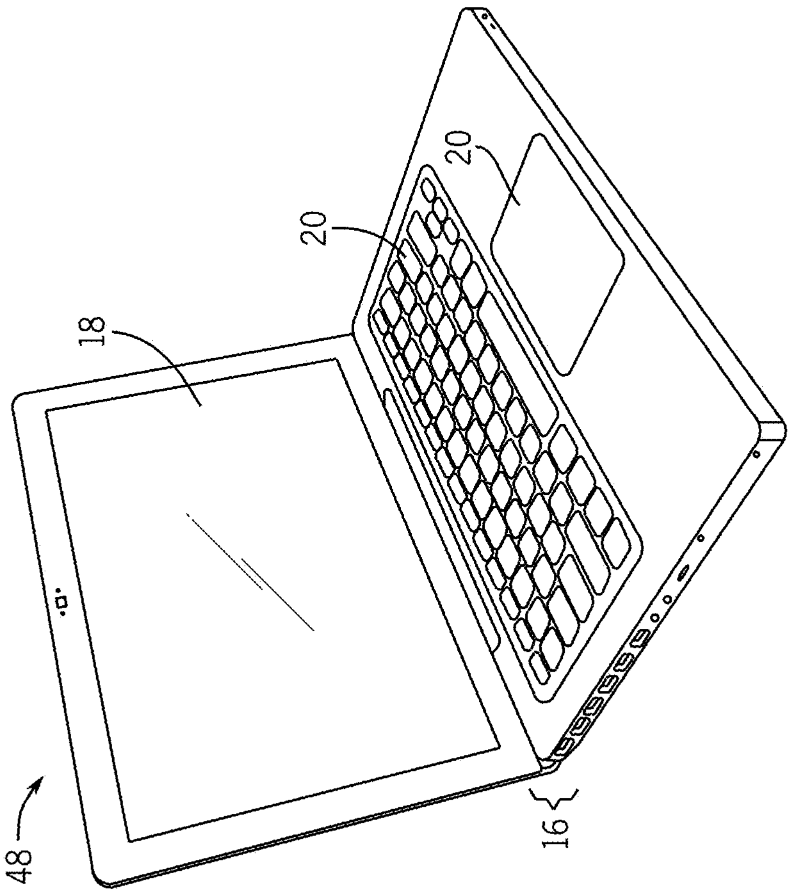
FIG. 4 is a front view of a computer representing an embodiment of the electronic device of FIG. 1, in accordance with an embodiment.

A computer 48 represents another form that the electronic device 10 may take, as shown in FIG. 4. For illustrative purposes, the computer 48 may be any Macbook® or iMac® model available from Apple Inc. It should be appreciated that the electronic device 10 may also take the form of any other computer, including a desktop computer. The computer 48 shown in FIG. 4 includes the display 18 and input structures 20, such as in the form of a keyboard and a track pad. Communication interfaces 16 of the computer 48 may include, for example, a universal serial bus (USB) connection.

Figure 5:
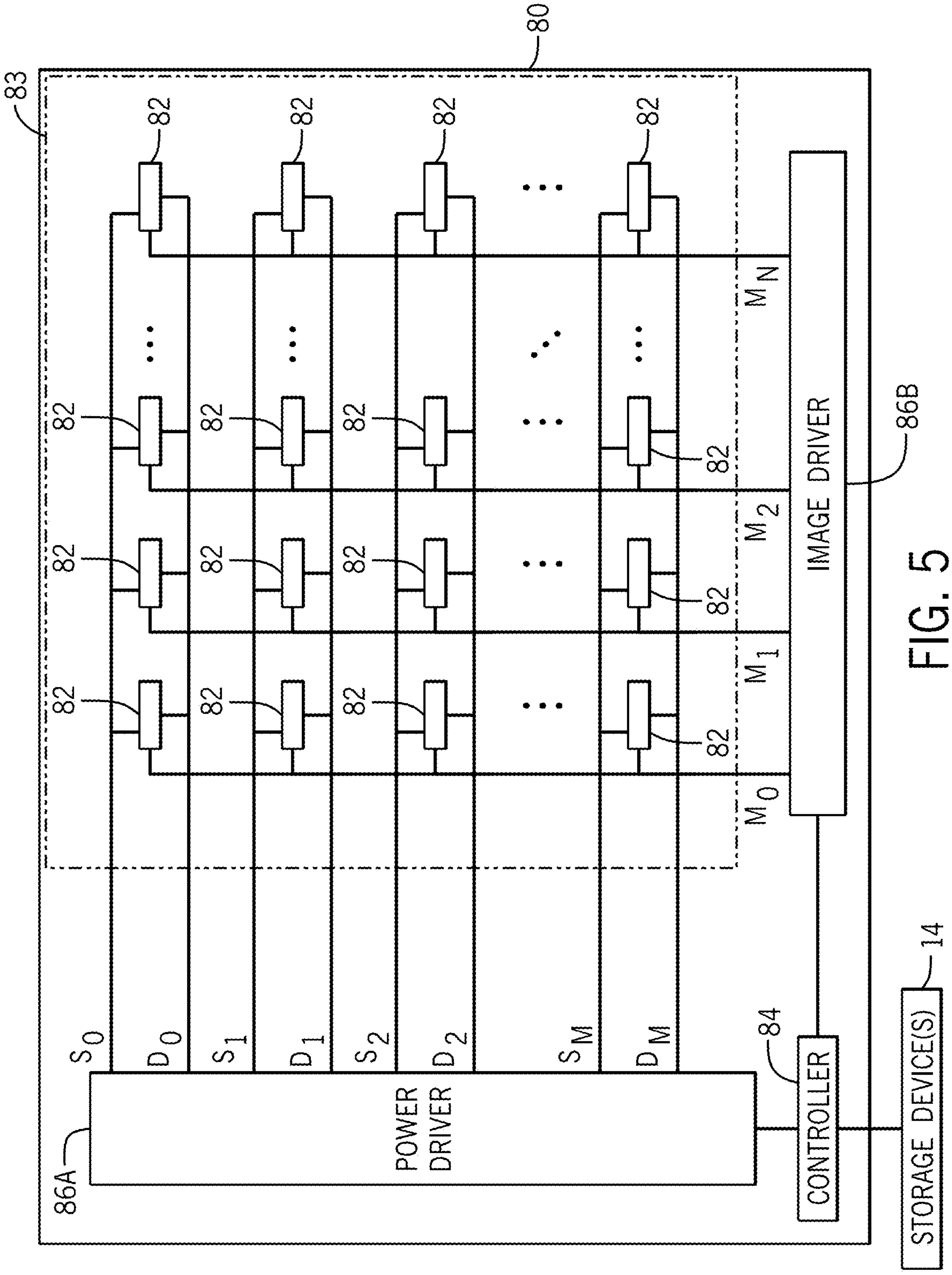
FIG. 5 is a circuit diagram of the display of the electronic device of FIG. 1, in accordance with an embodiment.

As shown in FIG. 5, the display 18 may include a pixel array 80 having an array of one or more pixels 82 within an active area 83. The display 18 may include any suitable circuitry to drive the pixels 82. In the example of FIG. 5, the display 18 includes a controller 84, a power driver 86A, an image driver 86B, and the array of the pixels 82. The power driver 86A and image driver 86B may drive individual of the pixels 82. In some cases, the power driver 86A and the image driver 86B may include multiple channels for independent driving of multiple pixels 82. Each of the pixels 82 may include any suitable light-emitting element, such as a LED, one example of which is an OLED. However, any other suitable type of pixel may also be used. Although the controller 84 is shown in the display 18, the controller 84 may sometimes be located outside of the display 18. For example, the controller 84 may be at least partially located in the processing core complex 12.

The scan lines S0, S1, . . . , and Sm and driving lines D0, D1, . . . , and Dm may connect the power driver 86A to the pixel 82. The pixel 82 may receive on/off instructions through the scan lines S0, S1, . . . , and Sm and may receive programming voltages corresponding to data voltages transmitted from the driving lines D0, D1, . . . , and Dm. The programming voltages may be transmitted to each of the pixel 82 to emit light according to instructions from the image driver 86B through driving lines M0, M1, . . . , and Mn. Both the power driver 86A and the image driver 86B may transmit voltage signals as programmed voltages (e.g., programming voltages) through respective driving lines to operate each pixel 82 at a state determined by the controller 84 to emit light. Each driver may supply voltage signals at a duty cycle and/or amplitude sufficient to operate each pixel 82.

The intensities of each pixel 82 may be defined by corresponding image data that defines particular gray levels for each of the pixels 82 to emit light. A gray level indicates a value between a minimum and a maximum range, for example, 0 to 255, corresponding to a minimum and maximum range of light emission. Causing the pixels 82 to emit light according to the different gray levels causes an image to appear on the display 18. In this way, a first brightness level of light (e.g., at a first luminosity and defined by a gray level) may emit from a pixel 82 in response to a first value of the image data and the pixel 82 may emit at a second brightness level of light (e.g., at a first luminosity) in response to a second value of the image data. Thus, image data may facilitate creating a perceivable image output by indicating light intensities to be generated via a programmed data signal to be applied to individual pixels 82.

The controller 84 may retrieve image data stored in the storage device 14 indicative of various light intensities. In some examples, the processing core complex 12 may provide image data directly to the controller 84. The controller 84 may control the pixel 82 by using control signals to control elements of the pixel 82. The pixel 82 may include any suitable controllable element, such as a transistor, one example of which is a metal-oxide-semiconductor field-effect transistor (MOSFET). However, any other suitable type of controllable elements, including thin film transistors (TFTs), p-type and/or n-type MOSFETs, and other transistor types, may also be used.

Figure 6:
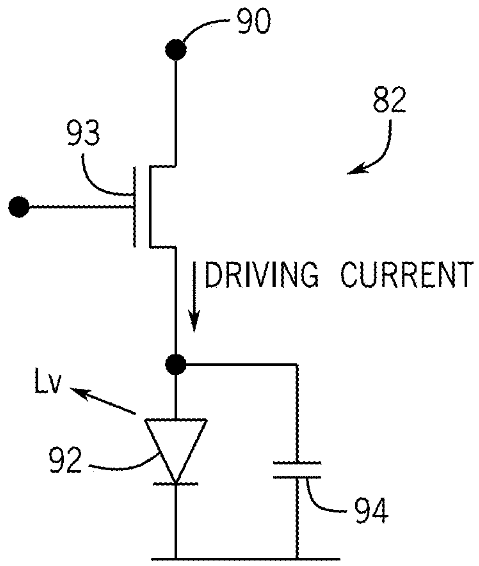
FIG. 6 is a circuit diagram of a pixel of the display of FIG. 5, in accordance with an embodiment.

FIG. 6 is a circuit diagram of an example of the described pixel 82. The pixel 82 depicted in FIG. 6 includes a terminal 90 to receive a driving current generated in response to a programming voltage programmed in response to the image data to be displayed. While the pixel 82 of FIG. 6 receives a data signal in the form a programming voltage, other examples of pixels 82 may receive a data signal in the form of a programming current or programming power. It should be understood that this disclosure is not meant to be limited only to pixels that receive programming voltages. Indeed, this disclosure also may be used for pixels of DMD, LCD, or plasma displays, or any other type of electronic display that may have non-uniform brightness-to-data relationships across pixels or groups of pixels. Returning to FIG. 6, the controller 84 may use the programming voltage and transmitted control signals to control the luminance, also sometimes referred to as brightness, of light (Lv) emitted from the pixel 82. It should be noted that luminance and brightness are terms that refer to an amount of light emitted by a pixel 82 and may be defined using units of nits (e.g., candela/m2) or using units of lumens. The programming voltage may be selected by a controller 84 to cause a particular luminosity of light emission (e.g., brightness level of light emitted, measure of light emission) from a light-emitting diode (LED) 92 (e.g., an organic light-emitting diode (OLED)) of the self-emissive pixel 82 or other suitable light-emitting element.

The programming voltage is applied to a transistor 93, causing a driving current to be transmitted through the transistor 93 onto the LED 92 based on the Lv-V curve characteristics of the transistor 93 and/or the LED 92. The transistor 93 may be any suitable transistor, such as in one example, an oxide thin film transistor (TFT). In this way, the light emitted from the LED 92 may be selectively controlled. When the Lv-V curve characteristics differ between two pixels 82, perceived brightness of different pixels 82 may appear non-uniform—meaning that one pixel 82 may appear as brighter than a different pixel 82 even when both are programmed by the same programming voltage. The controller 84 or the processing core complex 12 may compensate for these non-uniformities if the controller 84 or the processing core complex 12 are able to accurately predict the Lv-V behavior of the pixel 82. If the controller 84 or the processing core complex 12 are able to make the prediction, the controller 84 or the processing core complex 12 may determine what programming voltage to apply to the pixel 82 to compensate for differences in the brightness levels of light emitted between pixels 82.

Also depicted in FIG. 6 is a parasitic capacitance 94 of the LED 92. In some examples, a leakage current of the transistor 93 may continuously charge an anode of the LED 92 (e.g., the parasitic capacitance 94) such that the anode voltage approaches a turn-on voltage (e.g., a threshold voltage) for the LED 92. Once the anode voltage is equal to or greater than the turn-on voltage for the LED 92, the LED 92 emits light based on the value of driving current transmitted through the LED 92.

Figure 7A:
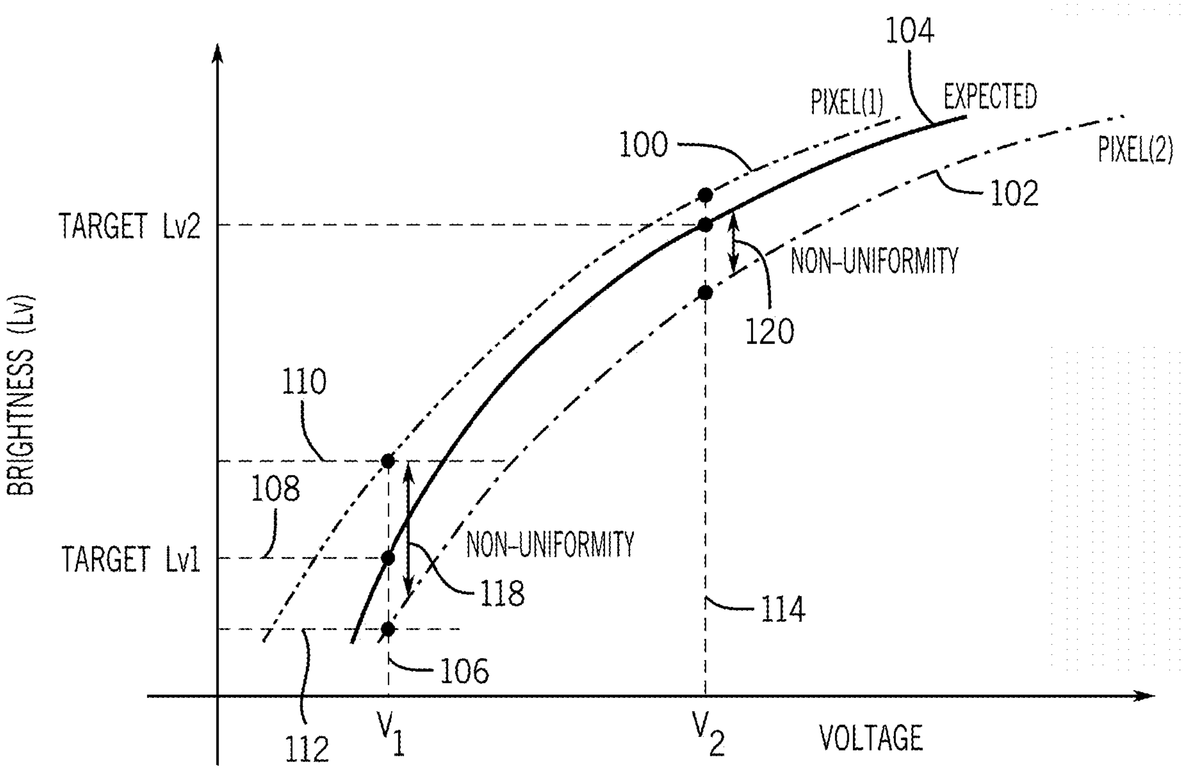
FIG. 7A is a graph of brightness-to-voltage (Lv-V) curves corresponding to pixels of the display of FIG. 5, in accordance with an embodiment.

To help illustrate non-uniform Lv-V curves, FIG. 7A is a graph of an Lv-V curve of a first pixel 82 (e.g., line 100) and an Lv-V curve of a second pixel 82 (e.g., line 102). These two Lv-V curves represent an example relationship between programming voltages (Vdata) used to drive the respective pixel 82 and the light emitted from the pixel 82 in response to the programming voltage. An Lv-V curve may be used by a controller to predict what amount of programming voltage to transmit to a pixel 82 to cause a light emission at a brightness level indicated by image data. Because these Lv-V curves are used to determine the programming voltage, deviations (e.g., non-uniformities) in the Lv-V curve from an expected response of the pixels 82 (e.g., line 104) may manifest as perceivable visual artifacts. The deviations shown in the graph between the line 100 and the line 104, in addition to the line 102 and the line 104, may be caused by non-uniform properties between various pixels 82 or regions of pixels 82.

During operation, a programming voltage is transmitted to a pixel 82 in response to image data to cause the pixel 82 to emit light at a brightness level to suitably display an image. This programming voltage is transmitted to pixels 82 to cause an expected response (e.g., a first programming voltage level is used specifically to cause a first brightness level to display an image). The expected response of the pixels 82 to a first voltage (V1) level 106 is a first brightness (Lv1) level 108, however, both responses from the first pixel 82 and the second pixel 82 deviate from that expected response (e.g., line 104). As illustrated on the graph, the first pixel 82 indicated by the line 100 responds by emitting a brightness level corresponding to brightness level 110 while the second pixel 82 indicated by the line 102 responds by emitting a brightness level 112. Both the brightness level 110 and the brightness level 112 deviate from the target brightness level of 108. This deviation between the Lv-V curves may affect the whole relationship, including the responses to a second voltage (V2) level 114 as illustrated on the graph. It should be noted that, in some cases, the pixel non-uniformity caused at least in part by the Lv-V curves is worse at lower programming voltages than higher programming voltages (e.g., net disparity 118 at a lower voltage is greater than net disparity 120 at a higher voltage).

Figure 7B:
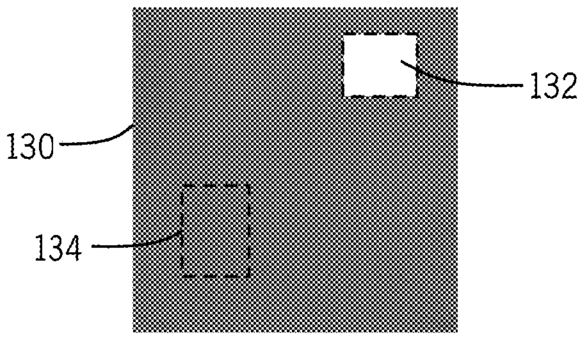
FIG. 7B is an illustration of non-uniform light emitted between pixels of the display of FIG. 5 without any compensation, in accordance with an embodiment.

FIG. 7B is an illustration depicting how the above-described non-uniformities between the Lv-V curves may manifest as visual artifacts on the display 18. This representation of a display panel 130 shows a portion 132 as different from a portion 134. The differences between the portion 132 and the portion 134 may be caused by material differences in transistors, for example, the transistor 93 or other transistors in a pixel 82.

Figure 8A:
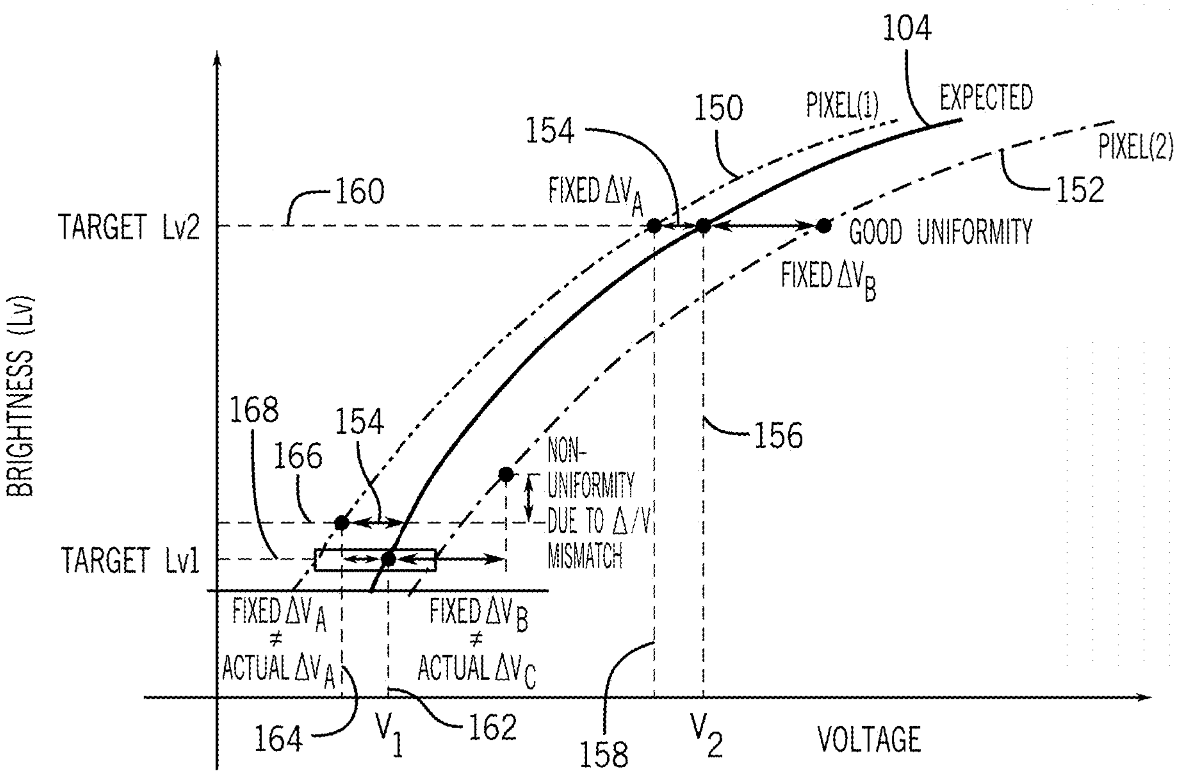
FIG. 8A is a graph of brightness-to-voltage (Lv-V) curves corresponding to pixels of the display of FIG. 5 including a depiction of a fixed correction, in accordance with an embodiment.

To correct for these non-uniformities, such as the differences between the portion 132 and the portion 134, a fixed correction may be used. FIG. 8A is a graph of an Lv-V curve of a first pixel 82 (e.g., line 150) and an Lv-V curve of a second pixel 82 (e.g., line 152). The Lv-V curve of the line 150 and the Lv-V curve of the line 152 have been shifted a fixed amount to attempt to compensate for pixel property non-uniformities. The shifting may be performed on a per-programed voltage basis-meaning that, each time a programming voltage is used to drive the first pixel 82, the programming voltage is changed by a same, fixed amount each time. This same, fixed amount is represented by fixed correction 154 and is applied to the desired voltage level 156 to determine the programming voltage used to drive the first pixel 82 to emit light. For example, a controller 84 may determine to program the first pixel 82 with the voltage level 156 and before driving the first pixel 82 with the voltage level 156, the controller 84 may perform a fixed correction (e.g., apply fixed correction 154) to compensate for non-uniformities between pixels 82 to generate a programming voltage at a voltage level 158. When driven at the voltage level 158, the first pixel 82 emits light at the same brightness level as the expected response represented by line 104, that is brightness level 160. While the fixed correction 154 may be suitable for some target brightness levels (e.g., brightness level 160), the fixed correction 154 may not be suitable for other target brightness levels (e.g., brightness level 166). In this way, a fixed correction may work for some target brightness levels but not for others. For example, when the controller 84 applies the same fixed correction (e.g., fixed correction 154) to a voltage level 162, the first pixel 82 emits according to a voltage level 164 that causes a brightness level of 166 instead of a target brightness level of 168. This suitability is shown through an elimination of the net disparity 120 and a reduction of net disparity 118 but not an elimination of the net disparity 118.

Figure 8B:
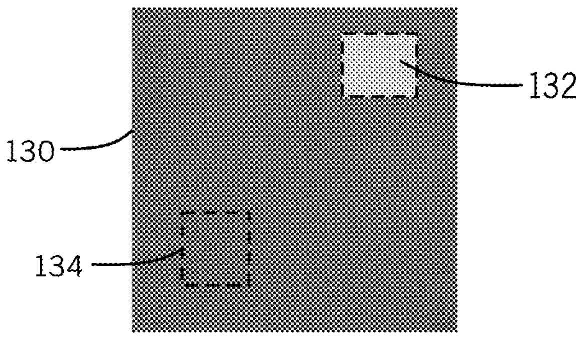
FIG. 8B is an illustration of non-uniform light emitted between pixels of the display of FIG. 5 corresponding to results of a fixed correction, in accordance with an embodiment.

FIG. 8B is an illustration depicting how the above-described fixed correction techniques may reduce visual artifacts on the display 18. The illustration represents a response of the display 18 to a target brightness level corresponding to 5 nits. Comparing FIG. 8B to FIG. 7B, the display panel 130 shows the portion 132 as different from the portion 134 in FIG. 7B but in FIG. 8B, the portion 132 and the portion 134 appear more uniform. The differences between the portion 132 and the portion 134 may be caused by material differences in transistors, for example, the transistor 93 or other transistors in a pixel 82, but are improved in response to the controller 84 applying the fixed correction to the programming voltages applied to the pixels 82. However, as described with FIG. 8A, these corrections may cause less improvement at lower brightness levels (e.g., less than 0.3 nit).

Figure 9A:
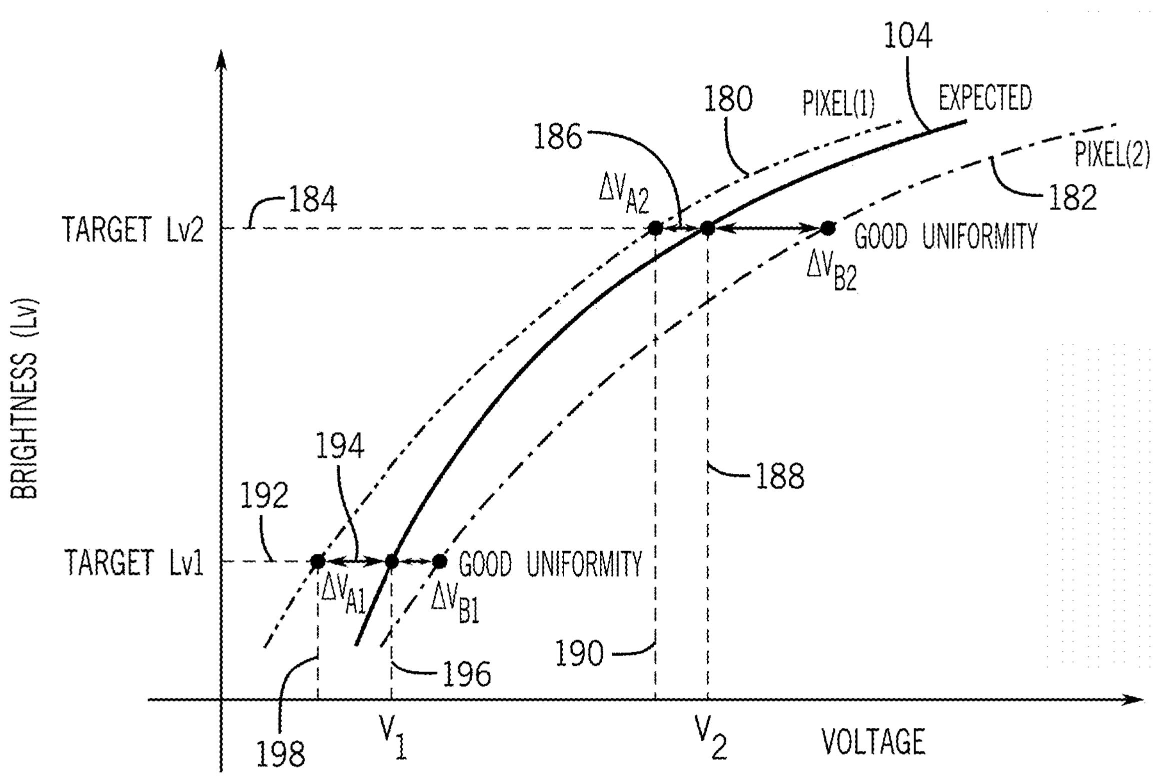
FIG. 9A is a graph of brightness-to-voltage (Lv-V) curves corresponding to two pixels of the display of FIG. 5 including a depiction of correction based on a per-pixel function, in accordance with an embodiment.

To improve the fixed correction techniques at lower brightness levels (e.g., to eliminate the net disparity 118 in addition to maintaining the eliminated net disparity 120), the controller 84 may use dynamic correction techniques, including applying a per-pixel function to determine a suitable correction a programming voltage. FIG. 9A is a graph of an Lv-V curve of a first pixel 82 (e.g., line 180) and an Lv-V curve of a second pixel 82 (e.g., line 182). The Lv-V curve of the line 180 and the Lv-V curve of the line 182 have essentially shifted an amount based on applying the per-pixel function to each respective pixel 82 (e.g., the first pixel 82 and the second pixel 82) to compensate for non-uniform pixel properties—meaning that, each time a programming voltage is used to drive the first pixel 82, the programming voltage may be changed by an amount specific to that particular pixel 82 to cause light emission from that pixel 82 at the target brightness level.

The effect of basing the compensation at least in part on the per-pixel function is depicted through the difference in compensations used on the Lv-V curves. For example, to cause the first pixel 82 to emit light at a brightness level 184, the programming voltage is changed an amount 186 from a first voltage level 188 to a second voltage level 190, while to cause the first pixel 82 to emit light at a brightness level 192, the programming voltage is changed by an amount 194 from a voltage level 196 to a voltage level 198, where the amount 194 may be different from the amount 186 (based on the per-pixel function for the first pixel 82). In this way, the amount 194 and the amount 186 may be different from the corresponding compensation amounts used for the second pixel 82. For example, a compensation amount 194 differs from the corresponding compensation amount 186 used to correct pixel non-uniformities of the first pixel 82.

Figure 9B:
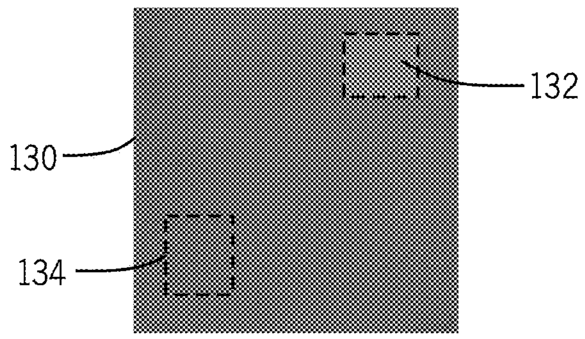
FIG. 9B is an illustration of non-uniform light emitted between pixels of the display of FIG. 5 corresponding to results of the correction based on a per-pixel function, in accordance with an embodiment.

FIG. 9B is an illustration depicting how the above-described dynamic correction techniques based on a per-pixel function may reduce visual artifacts on the display 18. The illustration represents a response of the display 18 to a target brightness level corresponding to 0.3 nit. Comparing FIG. 9B to FIG. 8B, the portion 132 and the portion 134 are perceived as uniform by a user of the display 18 despite being driven to emit light at a low brightness level (e.g., 0.3 nit). Previously illustrated differences between the portion 132 and the portion 134 (e.g., as illustrated in FIG. 7A) are now improved at low voltages in addition to high voltages. These differences are improved because the controller 84 compensates the programming voltages applied to the pixels 82 based on a per-pixel function applied to extracted parameters for each respective pixel 82 (or for regions of pixels 82).

Thus, as shown in FIG. 9A and FIG. 9B, a compensation based on a per-pixel function may be applied to more accurately account for varying Lv-V characteristics among pixels 82. To perform this compensation, the controller 84 or the processing core complex 12 may use an approximation of the Lv-V curve of the pixel 82 as the per-pixel function. Although described in terms of the approximated Lv-V curve herein, it should be understood that a per-pixel function may be any suitable relationship or function (e.g., a linear regression, a power law model, an exponential model) that correlates a data signal input to a brightness of light emitted by the pixel 82. When properly compensated, two pixels 82 intended to be driven at the same gray level may receive different programming voltages that result in the brightness level of light emitted. For example, a first pixel 82 may generate a current of a first value in response to a first voltage applied and a second pixel 82 may emit light at the same first brightness level in response to a second voltage applied, where the difference between the first and the second voltages account for the non-uniform properties between the pixels 82.

Figure 10:
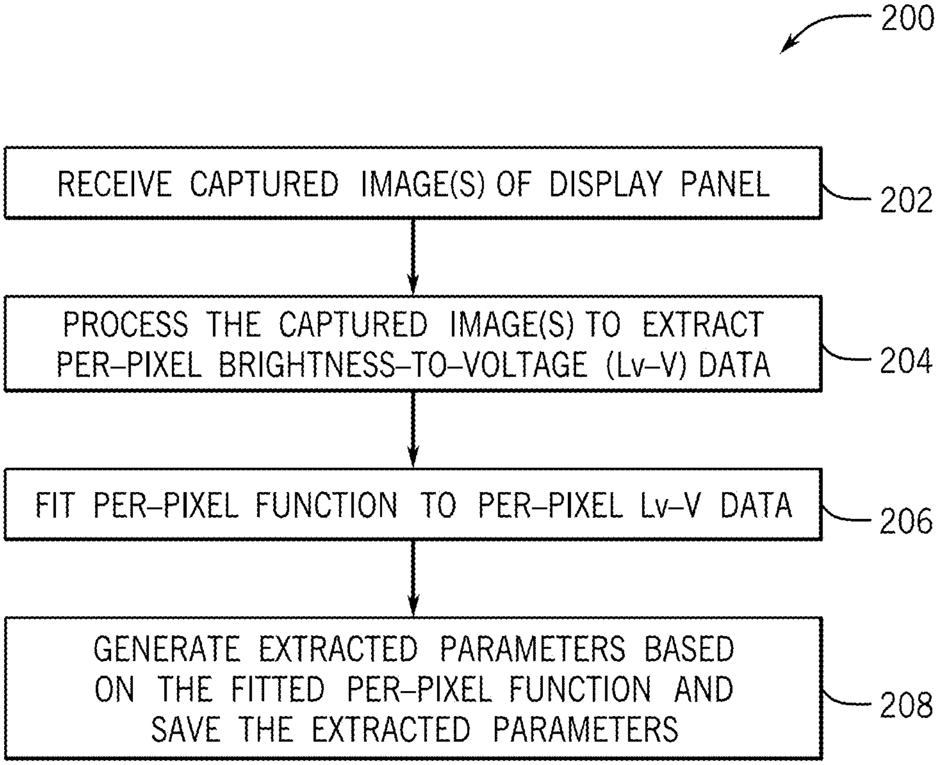
FIG. 10 is a flowchart of a process for deriving a per-pixel function, in accordance with an embodiment.

To help explain the per-pixel function, FIG. 10 is a flowchart of an example process 200 for extracting parameters to be later used in dynamic correction techniques. The process 200 of FIG. 10 includes receiving captured image(s) of a display 18 panel (block 202), processing the image(s) to extract per-pixel Lv-V data (block 204), fitting a per-pixel function to the per-pixel Lv-V data (block 206), and generating extracted parameters and saving the extracted parameters (block 208). It should be understood that, although the process 200 is described herein as being performed by the controller 84, any suitable processing circuitry, such as the processing core complex 12 or additional processing circuitry internal or external to the display 18, may perform all or some of the process 200. It should also be understood that the process 200 may be performed in any suitable order, including an order other than the described order below, and may include additional steps or exclude any of the described steps below.

At block 202, the controller 84 receives one or more captured images of a display 18 panel. These images may be captured during a calibration and/or testing period, where test image data is used to determine what per-pixel compensations to apply to each pixel 82 of the display 18 being tested. Programming voltages based on the test image data may be used to drive the pixels 82 to display a test image corresponding to the test image data. After the pixels 82 begin to display the test image, an external image capture device, or other suitable method of capturing images, may be used to capture one or more images of the display 18 panel. The one or more images of the display 18 panel may capture an indication of how bright the different portions of the display 18 panel are or communicate relative brightness levels of light emitted by pixels 82 of the display 18 panel in response to the test image data.

After receiving the one or more images, at block 204, the controller 84 may process the one or more images to extract per-pixel Lv-V data. As described above, the received images indicate relative light intensity or brightness between pixels 82 and/or between regions of the display 18 panel. The controller 84 may process the received images to determine the response of the pixel 82 to the test data. In this way, the controller 84 processes the received images to determine (e.g., measure, calculate) the brightness of the light emitted from the respective pixels 82 in response to the test data. The per-pixel Lv-V data determined by the controller 84 includes the known programming voltages (e.g., based on the test image data) and the determined brightness of light emitted.

At block 206, the controller 84 fits a per-pixel function to the per-pixel Lv-V data. The controller 84 may perform this curve-fitting in any suitable matter using any suitable function. A suitable function indicates a relationship between a programming voltage used to drive each pixel 82 and the light emitted from the pixel 82 in response to the programming voltage. The per-pixel function may be, for example, a linear regression, a power law model (e.g., current or brightness equals power multiplied by a voltage difference exponentially raised by an exponent constant representative of the slope between voltages), an exponential model, or the like. The relationship defined by the per-pixel function may be specific to a pixel 82, to a display 18, to regions of the display 18, or the like. In this way, one per-pixel function may be used for determining extracted parameters to define an Lv-V curve for a first pixel 82 while a different per-pixel function may be used for determining extracted parameters to define an Lv-V curve for a second pixel 82.

After fitting the per-pixel function to the per-pixel Lv-V data, at block 208, the controller 84 generates extracted parameters from the per-pixel function and saves the extracted parameters. In this way, the per-pixel function may represent a curve that is fitted to several data points gathered as the per-pixel Lv-V data but may be defined through a few key variables that represent the extracted parameters. Examples of the extracted parameters may include an amplitude, a rate of growth (e.g., expansion), slopes, constants included in a per-pixel function, or the like, where an extracted parameter is any suitable variable used to defined a fitted curve. The extracted parameters are extracted and saved for each pixel 82. These values may be stored in one or more look-up tables to be referenced by the controller 84 to determine the response of a respective pixel to a particular programming voltage. Fitting the per-pixel function to a dataset including the known programming voltages and/or the determined brightness of light emitted enables the per-pixel function to predict an overall input/output relationship for the pixel 82 based on extracted parameters associated with the fitted per-pixel function without having to store each individual data point of the input/output relationship.

Figure 11:
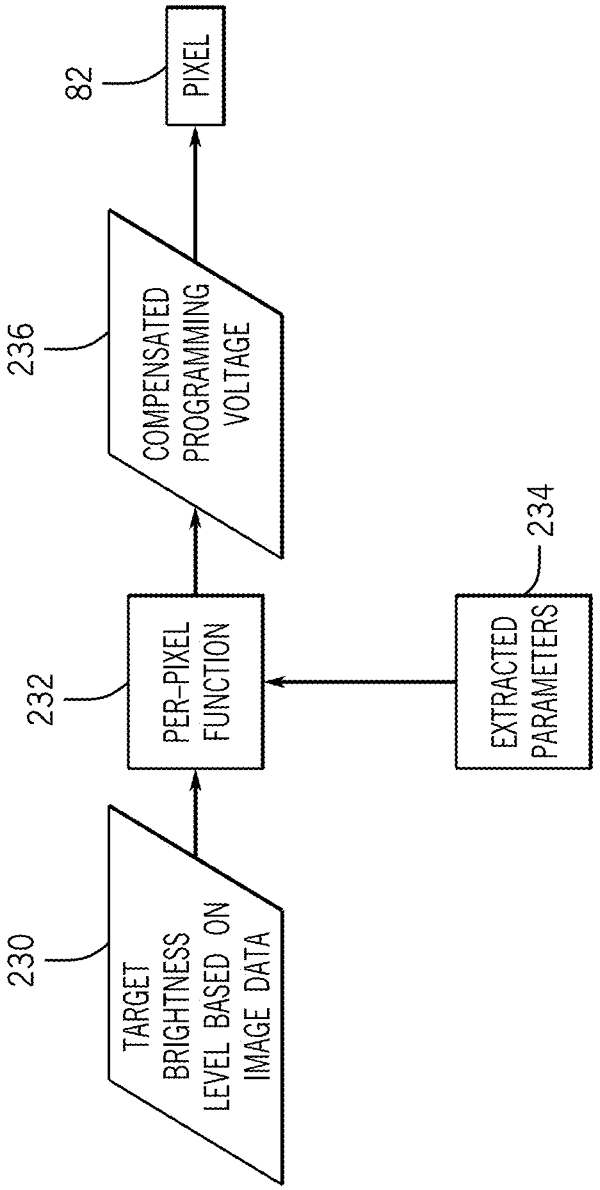
FIG. 11 is a block diagram representing applying a per-pixel function to obtain a compensated data signal used to drive the pixel of FIG. 6 to compensate for pixel non-uniformity, in accordance with an embodiment.

To better explain how the controller 84 may compensate for Lv-V non-uniformity among pixels 82, FIG. 11 is a block diagram illustrating the application of a dynamic correction techniques based on a per-pixel function and to a target brightness level 230. A variety of suitable components of the electronic device 10 may be used to perform the adjustments, including but not limited to, hardware and/or software internal and/or external to the display 18 (e.g., the controller 84 or the processing core complex 12).

In general, the controller 84 may apply the target brightness level 230 to a per-pixel function 232 that receives the target brightness level 230 and one or more extracted parameters 234 (e.g., variables based on the pixel 82). As described above, the per-pixel function 232 may be any suitable function that generally describes the Lv-V characteristics of each respective pixel 82. The extracted parameters 234 may be values stored in memory (e.g., in one or several look-up tables). When used in the function, the extracted parameters 234 permit the per-pixel function 232 to produce a first form of compensation for pixel values by, for example, translating the target brightness level to a corresponding programming voltage. This is shown in FIG. 11 as a compensated programming voltage 236, which may represent the programming voltage for the pixel 82 that is intended to achieve a target brightness level of light emitted from the LED 92 of the pixel 82.

As mentioned above, this first per-pixel function 232 may not always, on its own, provide a complete compensation. Indeed, the per-pixel function 232 may produce an approximation of the Lv-V curve of the pixel 82 based on the extracted parameters 234. Thus, rather than define the Lv-V curve of the pixel 82 using numerous measured data points, the Lv-V curve of the pixel 82 may be approximated using some limited number of variables (e.g., extracted parameters 234) that may generally define the Lv-V curve. The extracted parameters 234 may be determined based on measurements of the pixels 82 during manufacturing or based on measurements that are sensed using any suitable sensing circuitry in the display 18 to identify the Lv-V characteristics of each pixel 82.

Since the per-pixel function 232 provides an approximation of an actual Lv-V curve of a pixel 82, the resulting compensated programming voltage 236 (based on the target brightness level) may be further compensated in some examples (but not depicted). The compensated programming voltage 236 is used to program the pixels 82. Any additional compensations may be applied to the compensated programming voltage before being applied to the pixel 82.

Figure 12:
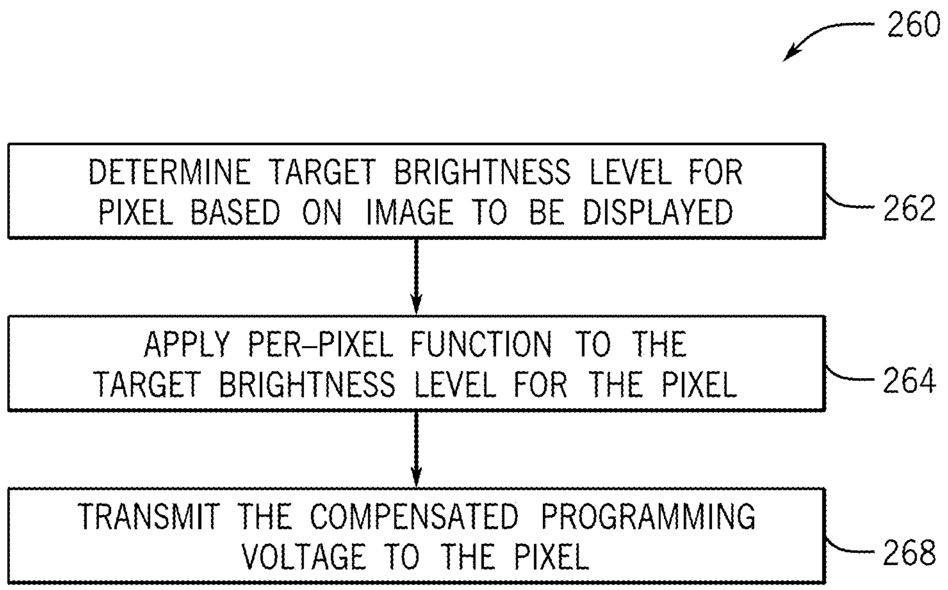
FIG. 12 is a flowchart of a process for applying the per-pixel function of FIG. 11, in accordance with an embodiment.

FIG. 12 is a flowchart of a process 260 for performing the dynamic correction techniques associated with the per-pixel function 232 of FIG. 11 that the controller 84 may follow in operating to correct for non-uniformities of the display 18 panel. The process 260 of FIG. 12 includes determining a target brightness level for a pixel to emit light at based on image to be displayed (block 262), applying a per-pixel function to determine a driving signal for the pixel (block 264), and transmitting the driving signal to the pixel (block 268). It should be understood that, although the process 260 is described herein as being performed by the controller 84, any suitable processing circuitry, such as the processing core complex 12 or additional processing circuitry internal or external to the display 18, may perform all or some of the process 260. It should also be understood that the process 260 may be performed in any suitable order, including an order other than the described order below, and may include additional steps or exclude any of the described steps below.

At block 262, the controller 84 determines a target brightness level 230 for a pixel 82 to emit light at based on image data. The target brightness level 230 corresponds to a gray level associated with a portion of the image data assigned to the pixel 82. The controller 84 uses the target brightness level 230 to determine a compensated programming voltage 236 to use to drive the pixel 82. A proportion associating the gray level indicated by the image data to a target brightness level, or any suitable function, may be used in determining the target brightness level 230.

At block 264, the controller 84 applies the per-pixel function 232 to the target brightness level 230 for the pixel 82 to determine a compensated programming voltage 236. The controller 84 determines a compensated programming voltage 236 for the pixel 82 based on the target brightness level 230 and based on the extracted parameters 234. The extracted parameters 234 are used to predict the particular response of the pixel 82 to the various programming voltages that may be applied (e.g., the per-pixel function 232 for that pixel 82). Thus, based on the per-pixel function, the controller 84 determines the programming voltage 236 to apply to cause the pixel 82 to emit at the target brightness level 230, or a compensation to make to a programming voltage to be transmitted to the pixel 82 (e.g., such as in cases where each pixel 82 to emit at the target brightness level 230 receives the same programming voltage that is later changed before being used to drive a pixel 82 based on the per-pixel function 232 for the pixel 82). It should be noted that although described as a programming voltage, the compensated programming voltage 236 may be any suitable data signal used to change a brightness of light emitted from the pixel 82 in response to image data. For example, the controller 84 may determine and/or generate a control signal used to change a data signal, such as a programming voltage, to generate a compensated data signal, such as the compensated programming voltage 236.

Using the compensated programming voltage 236, at block 268, the controller 84 may transmit the compensated programming voltage 236 to the pixel 82 by operating a driver 86 of the display 18 to output the compensated programming voltage 236 level to the pixel 82. The compensated programming voltage 236 causes the pixel 82 to emit light at the target brightness level 230. Thus, through the controller 84 transmitting the compensated programming voltage 236 to the pixel, visual artifacts of the display 18 are reduced via correction and compensation for non-uniform properties between pixels 82.

Figure 13:
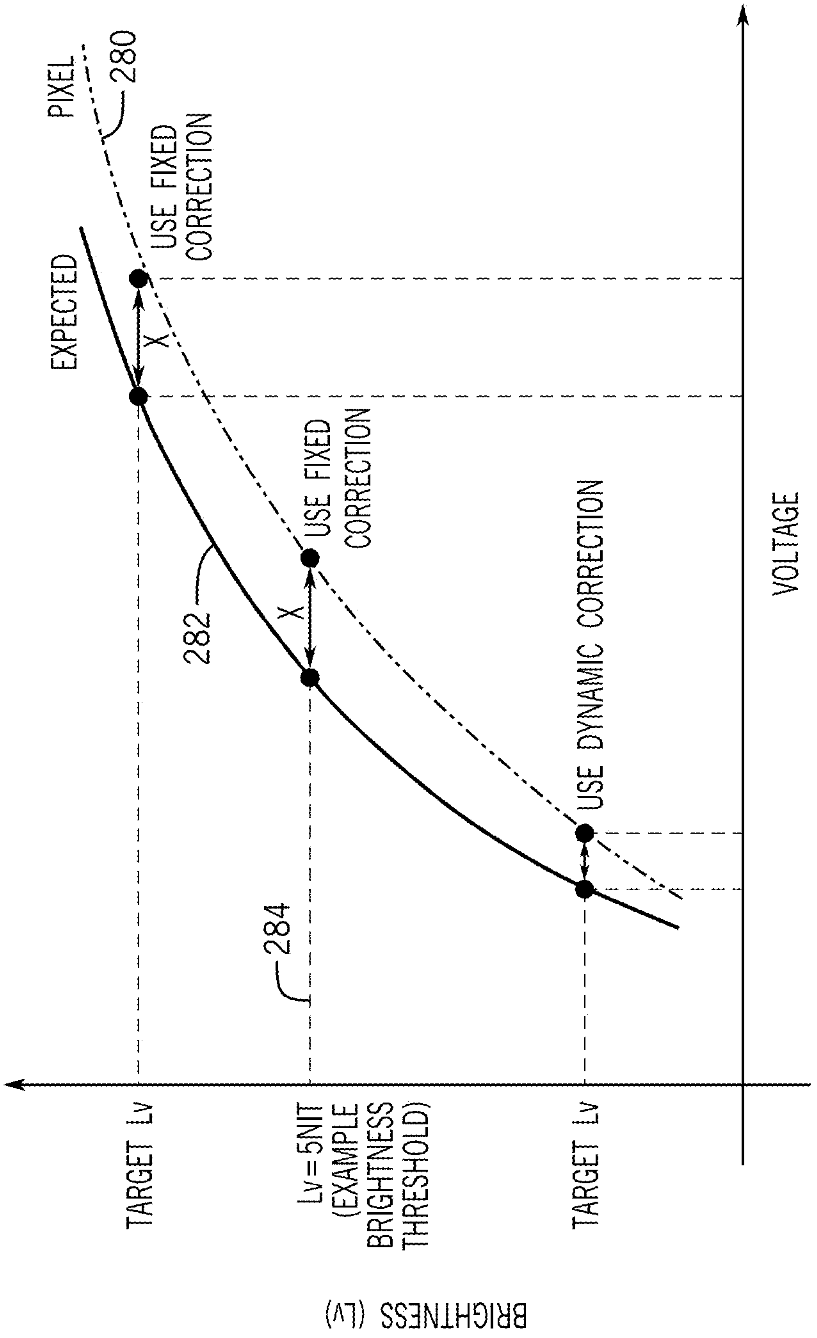
FIG. 13 is a graph of brightness-to-voltage (Lv-V) curves corresponding to an example correction technique that uses a dynamic correction based on a per-pixel function for low brightness values and a fixed correction for higher brightness values to obtain a compensated data signal used to drive the pixel of FIG. 6 to compensate for pixel non-uniformity, in accordance with an embodiment.

In some examples, a technique using a combination of a fixed correction and a dynamic correction may be applied by the controller 84 to compensate for non-uniform properties of pixels 82. FIG. 13 is a graph of an Lv-V curve of a first pixel 82 (e.g., line 280) and an Lv-V curve associated with an expected response of a pixel 82 to various programming voltages (e.g., line 282). The controller 84 using a combination of techniques to determine a programming voltage may apply a certain technique for target brightness levels 230 below a threshold and may apply a different technique for target brightness levels 230 above or at the threshold. For example, as is depicted, the controller 84 applies the fixed correction (e.g., value of x) for target brightness levels 230 at or above the threshold brightness level of 5 nit (e.g., threshold level 284) but uses dynamic correction techniques for target brightness levels 230 (e.g., to correct by any suitable value) below the threshold brightness level of 5 nit. It should be understood that the threshold brightness level may equal any suitable brightness level and that any number of thresholds may be used to control the compensation technique used for various target brightness levels. Using a combination of techniques may lessen processing resources while maximizing benefits from using the per-pixel function 232 for target brightness levels 230 below the threshold brightness level and minimizing processing resources dedicated to target brightness levels 230 above or at the threshold brightness level where a fixed correction may be a suitable form of correction to apply.

In addition to determining the per-pixel function 232 and extracted parameters 234 (e.g., via the process 200), the controller 84 receives one or more images at the block 202. The number of images received by the controller 84 may correspond to a number of missing variables of the per-pixel function, such that the images may facilitate a creation of a system of equations to determine one or more unknown variables. For example, three images may be captured and transmitted to the controller to be used to determine three unknown variables. These captured images may represent different outputs to different test data. In this way, a first test programming voltage may be used to generate a first captured image and a second test programming voltage may be used to generate a second captured image, where both the first captured image and the second captured image may be used to determine the extracted parameters. In some examples, the one or more unknown variables correspond to the extracted parameters 234.

Figure 14:
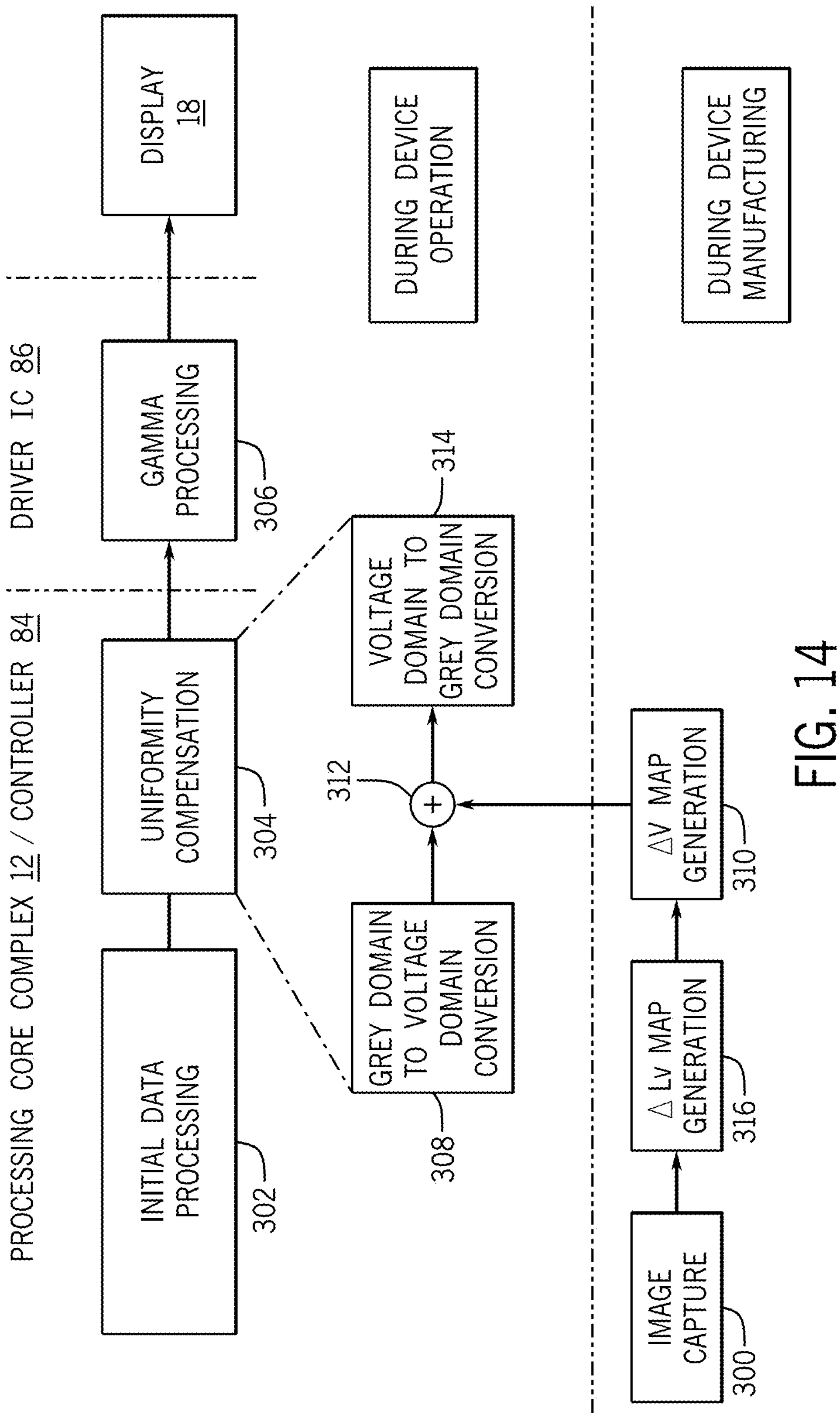
FIG. 14 is a block diagram representing compensation systems that apply a per-pixel function to obtain a compensated data signal used to drive the pixel of FIG. 6 to compensate for pixel non-uniformity, in accordance with an embodiment.

Keeping the foregoing in mind, a map may result from the above-described image captures. FIG. 14 is a block diagram illustrating a compensation system that applies a per-pixel function derived from an image (e.g., image capture operations 300) when compensating for non-uniform properties between pixels 82. The compensation system may include several operations performed throughout the electronic device 10. For example, the compensation system of the electronic device 10 may perform initial data processing operations 302 (e.g., white point correction operations, burn-in compensation operations, dithering operations, or the like) and uniformity compensation operations 304 via the processing core complex 12, the controller 84, and/or other suitable processor, such as a display pipe (e.g., display pipeline) of the processing core complex 12, may perform gamma processing operations 306 using one or more of the drivers 86, and may drive pixels 82 of the display 18 to present images based on outputs from the gamma processing operations 306. The application of the per-pixel function may occur during the uniformity compensation operations 304, as previously described with respect to FIGS. 1-13.

To do this, one or more input gray domain programming voltages may be converted into voltage domain programming voltages via gray domain to voltage domain conversion operations 308. While at least one programming voltage is in the voltage domain, the processing core complex 12 and/or the controller 84 may reference a voltage map (e.g., map) generated during manufacturing of the electronic device 10 (e.g., ΔV map generation operations 310) to determine the per-pixel function 232 applicable to the programming voltage. The per-pixel function 232 is applied to the programming voltage in the voltage domain via summation block 312, and the output is converted back into the gray domain via a voltage domain to gray domain conversion operation 314 for use in additional preparatory operations before being used as the compensated programming voltage 236. For ease of discussion herein, it should be understood that the processing core complex 12 and/or the controller 84 may perform the described operations even if the controller 84 is referred to as performing the operation.

The per-pixel function 232 may be derived from an image captured of the display 18 while operated at a particular input brightness value. In this way, the image captured during the image capture operations 300 may be used to generate one or more maps (e.g., during electronic device 10 manufacturing and/or calibration). For example, image data of the image captured via the image capture operations 300 may be used to generate a change in brightness map (e.g., ΔLv map via ΔLv map generation operations 316) and to generate, from the ΔLv map, a change in voltage map (ΔV map). It is also noted that in some cases, the per-pixel functions 232 may be represented and/or stored in storage device 14 using anchor points, or key data points of each respective per-pixel function 232 such that storing a full relationship may be avoided or reduced. The anchor points may include data or data points that are applied to a stored relationship (e.g., key axis intercept points, slope of lines) to recreate a full per-pixel function 232 at a later time. Driving of the display 18 and/or compensation operations may improve since data retrieval times during compensation operations may be reduced (since relatively smaller data sets are being processed and/or searched). In some cases, the per-pixel functions 232 (or anchor points) based on the ΔV map may be relatively less accurate as the input brightness value of the display 18 at a time of compensation (e.g., during operation rather than manufacturing and/or calibration) deviates from the input brightness value of the display 18 at a time of the image capture operations 300 (e.g., during manufacturing and/or calibration). Generating several ΔV maps, each at differing input brightness levels, may help improve compensation operations.

For example, several maps may be generated at different brightness levels during image capture operations 300 and map generation operations 310, 316. Later, a map from the several maps may be selected based on real-time operating conditions (e.g., brightness levels at a present time). For example, a map may be selected in response to an input brightness value and be used to derive a per-pixel function 232 associated with both a particular pixel 82 and the real-time operating condition, such as by referencing anchor points of a previously determined per-pixel function. Selecting the map in response to a present input brightness level or ongoing screen brightness may improve compensation operations since this operation permits a desired map, or map calibrated for the particular input brightness level, to be used for compensation operations when the input brightness level is to be used. It is noted that in some cases, the selected map may be further processed after selection and/or in preparation for application to input image data to improve compensation operations.

Figure 15:
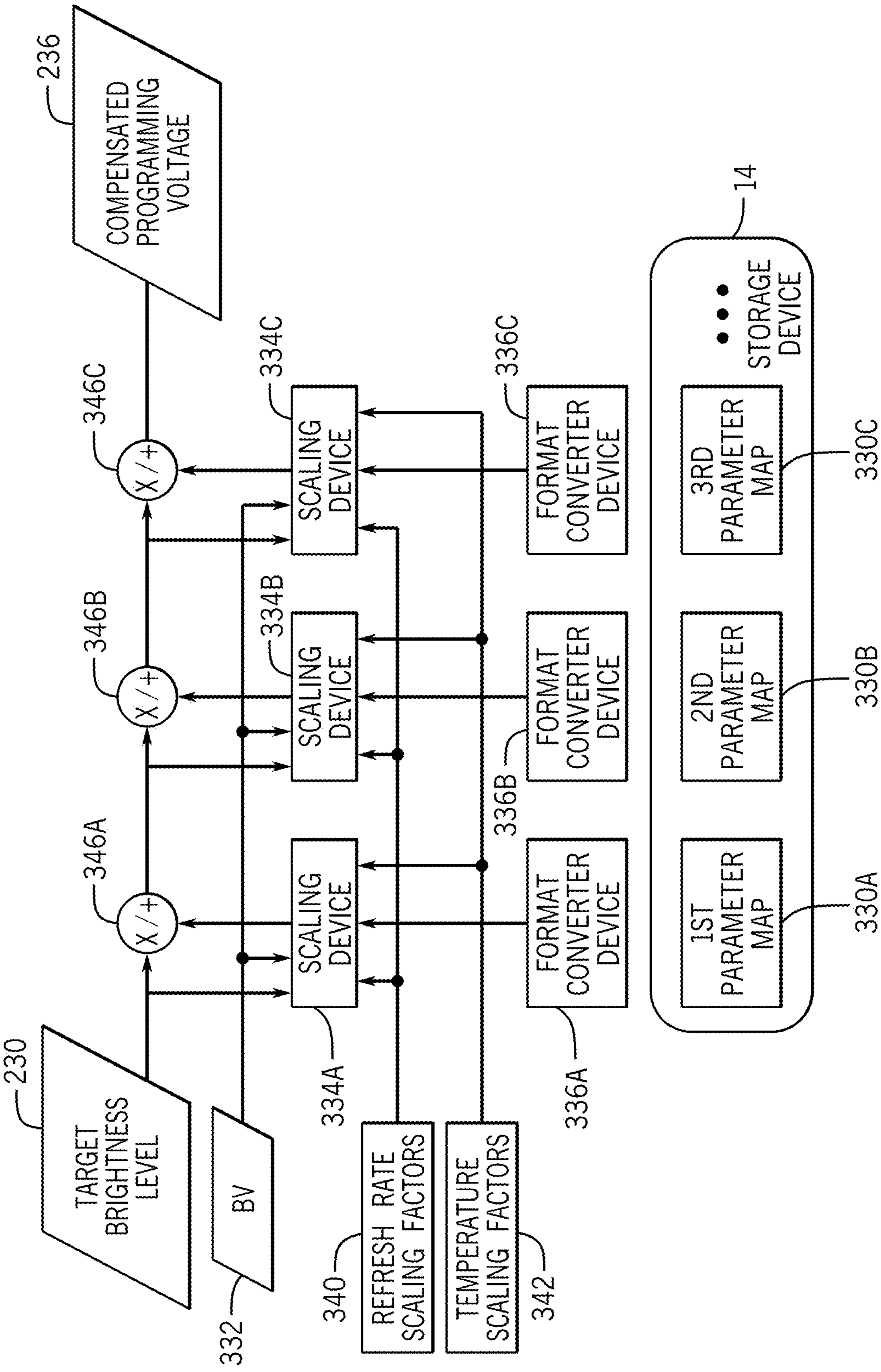
FIG. 15 is a block diagram illustrating a compensation system that applies a per-pixel function derived from a map when compensating for non-uniform properties between pixels, in accordance with an embodiment.

To elaborate, FIG. 15 is a block diagram illustrating a compensation system that applies a per-pixel function derived from a map selected from multiple maps 330 (map 330A, map 330B, map 330C) when compensating for non-uniform properties between pixels 82. In some cases, the compensation system may be implemented wholly or partially by a controller 84. The controller 84 may select the map based at least in part on an input brightness value (BV) 332. The selected map may have been generated from image data captured at the input brightness value 332 during calibration or map generation operations and/or from image data a threshold amount of brightness from the input brightness value 332. It is noted that although depicted as separate devices, each of the described processes performed by the separate devices may be performed by the controller 84 and/or one or more other processing devices executing instructions stored in the storage devices 14 and/or executing firmware and/or software.

The input brightness value 332 may be a global brightness value. For example, the input brightness value 332 may correspond or be the brightness level of the display 18, and thus may change in response to ambient lighting conditions of the electronic device 10. In some examples, the input brightness value 332 may be a value derived or generated based on a histogram of an image to be displayed, a histogram of an image that is currently displayed, and/or a histogram of an image previously displayed. Furthermore, in some examples, the input brightness value 332 may correspond to a regional brightness, such as a brightness of a subset of pixels 82 of the display 18 or a brightness of an image to be presented via a subset of pixels 82 of the display. The input brightness value 332 may also be determined on a per-pixel basis, such as associated with a brightness that the pixel 82 is to emit light.

In this example, the controller 84 may select the map by masking non-selected maps at scaling devices 334 (scaling device 334A, scaling device 334B, scaling device 334C). However, in some cases, the map is selected by retrieving the selected map from the storage device 14 without retrieving the non-selected maps. When one or more maps 330 are output from the storage device 14, the one or more maps 330 may undergo a format conversion to make information stored in the one or more maps 330 readable and/or usable by the controller 84. For example, format converter devices 336 (format converter device 336A, format converter device 336B, format converter device 336C) may change a data width of the one or more maps 330, a data type of the one or more maps 330, or the like. For example, the one or more maps 330 may be compressed in the storage device 14 and may undergo decompression before use by the controller 84. Additionally or alternatively, the one or more maps 330 may be stored as any of the following data types and converters into any of the following data types: an analog-defined parameter (e.g., data value, status), a digitally-defined parameter, a Boolean-defined parameter, a Floating-point-defined parameter, a character-defined parameter, a string-defined parameter, an integer-defined parameter, or any combination thereof.

It should be understood that, although described as devices, the scaling devices 334, the format converter devices 336, and any of the devices described herein, may be provided via hardware, software, or both. For example, the scaling devices 334 may be firmware stored in memory of the controller 84, and thus be at least partially deployed in software of the electronic device 10.

The scaling devices 334 may each receive target brightness levels 230, one or more refresh rate scaling factors 340, the input brightness value 332, and/or one or more temperature scaling factors 342. The scaling devices 334 may use these inputs to adjust the target brightness levels 230 to generate a compensated programming voltage 236. For example, the scaling devices 334 may store a relationship that adjusts presently received target brightness levels 230 based on the refresh rate scaling factors 340, previously received target brightness levels 230, and/or the temperature scaling factors 342. An output from the scaling devices 334 may be used to adjust the target brightness levels 230 at combination circuitry 346 (combination circuitry 346A, combination circuitry 346B, combination circuitry 346C). The combination circuitry 346 may permit the scaling devices 334 to determine collective scaling factors based on the refresh rate scaling factors 340, previously received target brightness levels 230, and/or the temperature scaling factors 342 and apply the collective scaling factors at the combination circuitry 346 with the target brightness levels 230 (e.g., presently received target brightness levels 230).

Generating the compensated programming voltages 236 using the relationship may reduce crosstalk portions of the display 18. Reducing crosstalk may reduce an amount of interference causing residual or ongoing charges on circuitry of the display 18 to alter driving of pixels 82 at a present time. For example, crosstalk resulting from previously target brightness levels 230 since the relationship applied by the scaling devices 334 may consider the previously received target brightness levels 230. Furthermore, generating the compensated programming voltage 236 using the relationship may reduce a non-uniform appearance of the display 18 resulting from refresh rate variations and/or temperature variations since the relationship may consider the refresh rate scaling factors 340 determined based at least in part on a present refresh rate and/or the temperature scaling factors 342 determined based at least in part on a present temperature.

Figure 16:
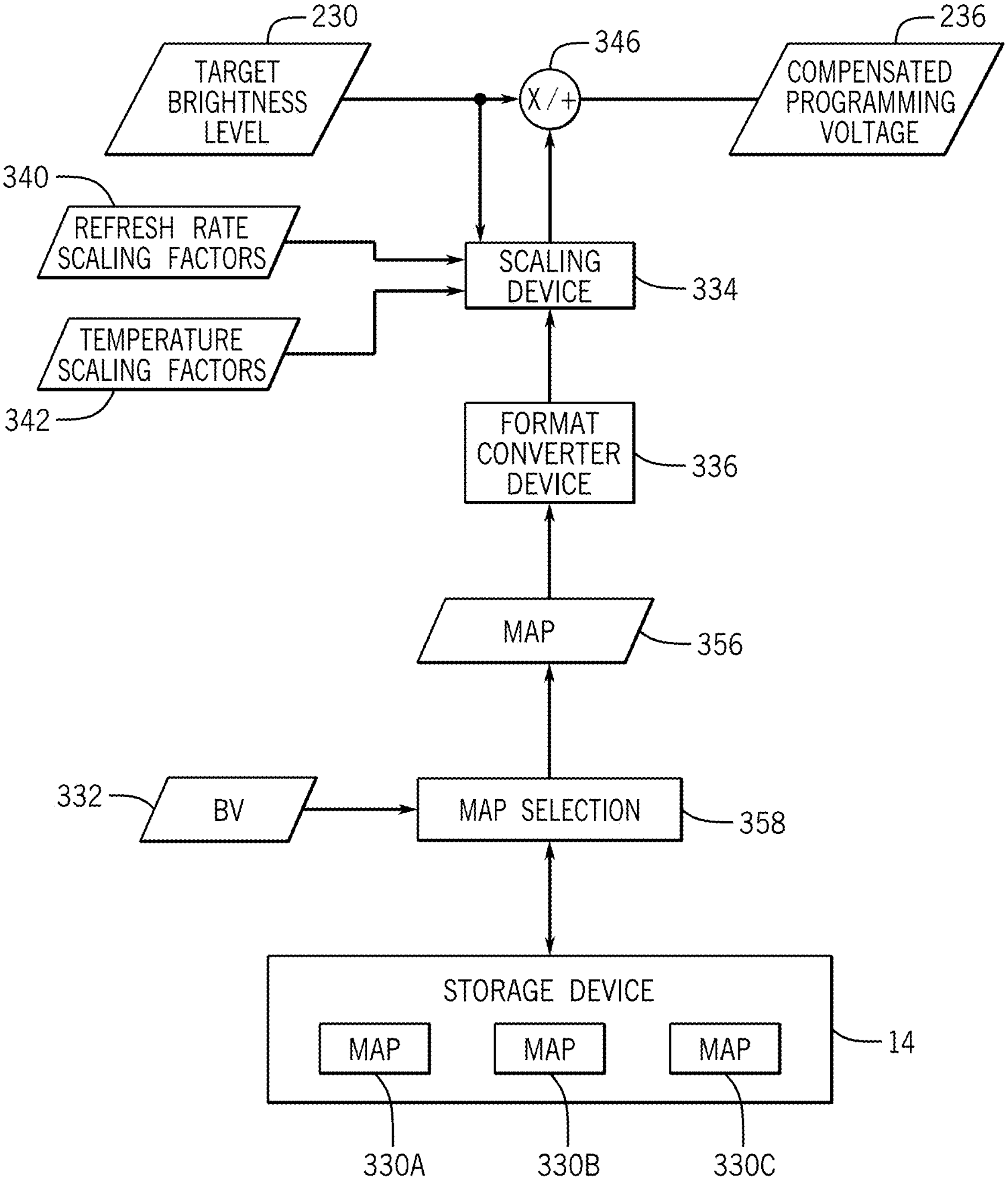
FIG. 16 is a block diagram illustrating another example compensation system that applies a per-pixel function derived from a map when compensating for non-uniform properties between pixels, in accordance with an embodiment.

In some cases, a selected map of the maps 330 is transmitted for use from the storage device as opposed to being masked out of computation by one or more of the scaling devices 334. For example, FIG. 16 is a block diagram illustrating a compensation system that applies a per-pixel function derived from a map 356 selected by map selection device 358 from the maps 330. It is noted that although depicted as separate devices, each of the described processes performed by the separate devices may be performed by the controller 84 and/or one or more other processing devices executing instructions stored in the storage devices 14 and/or executing firmware and/or software.

It is also noted that some or all of the systems and/or methods described in FIG. 15 may be similarly used in FIG. 16, and thus previous descriptions may be relied upon herein.

The map selection device 358 may retrieve the map 356 from the storage device 14 based at least in part on the input brightness value 332. The map 356 is then used for processing of the target brightness level 230 to generate the compensated programming voltage 236. It is also noted that one or more additional preparatory operations may adjust an output of the combination circuitry 346 when generating the compensated programming voltage 236. In this way, for example, the voltage domain to gray domain conversion operation 314 and/or the gamma processing operations 306 may be performed as the additional preparatory operations before the output from the combination circuitry 346 is used as the compensated programming voltage 236.

Usage of the different maps 330 may enable compensation operations to better correct the target brightness levels 230 according to a more uniform pixel curve that reduces a likelihood of over-compensation or under-compensation occurring. An example of this is shown in FIG. 17.

Figure 17:
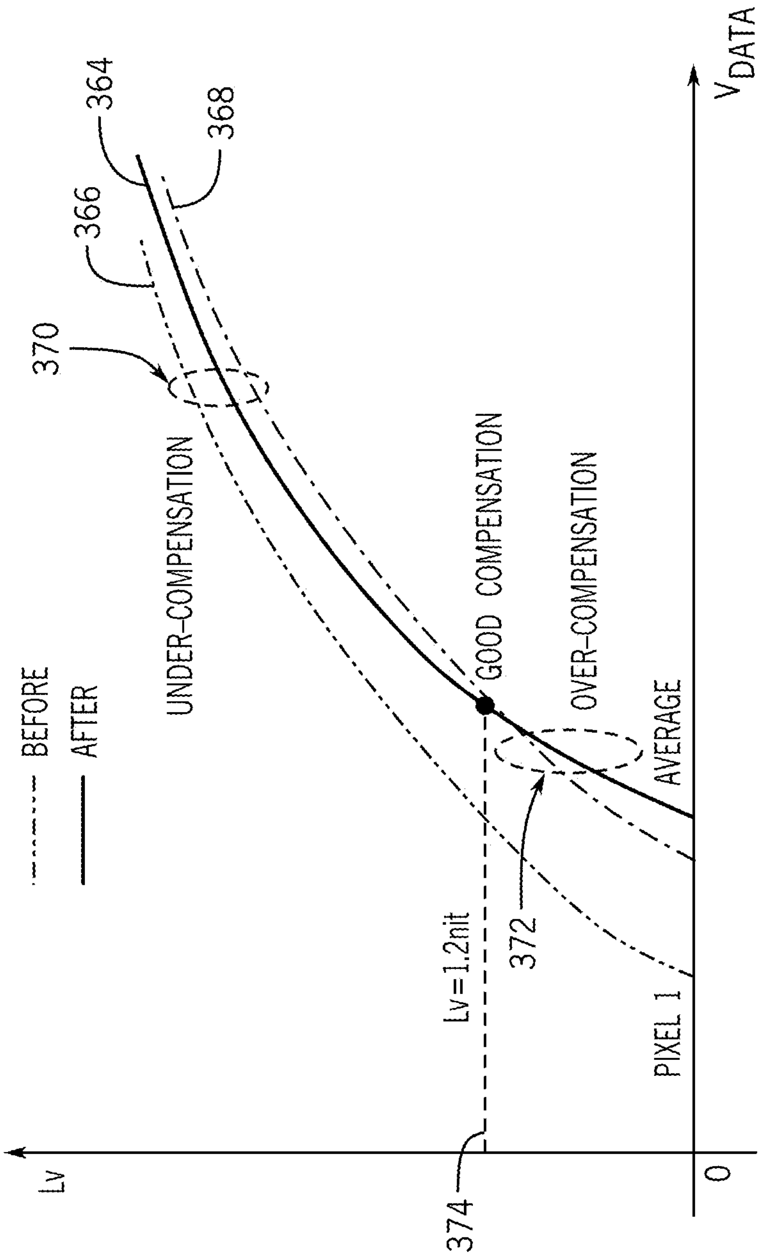
FIG. 17 is a graph of brightness-to-voltage (Lv-V) curves corresponding to a pixel of the display of FIG. 1, in accordance with an embodiment.

FIG. 17 is a graph of brightness-to-voltage (Lv-V) curves corresponding to a pixel 82 of the display 18. When compensating programming voltages according to pre-determined per-pixel functions 232, under-compensation or over-compensation may result when not applying a particular per-pixel function 232 to a programming voltage with consideration for brightness values of the display 18 (e.g., a per-pixel function selected without using the maps 330). In the graph of FIG. 17, line 364 represents an average Lv-V curve of pixels 82 of the display 18 while line 366 represents the particular per-pixel behavior for a first pixel 82 (e.g., pixel 1). When compensating programming voltages to cause the first pixel 82 to emit light according to the average Lv-V curve, the extracted parameters 234 referenced may compensate the programming voltage data in such a way as to cause the first pixel 82 to emit according to an Lv-V curve represented by line 368. As shown via arrow 370 and arrow 372, when consideration is not paid to a brightness value of the display 18 at a time of compensation, over-compensation or under-compensation may result. For example, if the Lv-V curve was generated based on an image captured which the display 18 was at an input brightness value 374 (e.g., 1.2 nit), accurate compensation may be performed when the pixel 82 is to present at the input brightness value 374. However, a deviation from the input brightness value 374 at a time of image capture may lessen an accuracy of the compensation, and may manifest as an under-compensation (e.g., arrow 370) or over-compensation (e.g., arrow 372).

Generating per-pixel functions from a map selected based on real-time operating conditions may improve compensation operations (e.g., improve a perceived uniformity of the display 18). In this way, several maps may be generated at different brightness levels during image capture operations 300 and map generation operations 310, 316, and later selected from when selecting a specific map based on real-time operating conditions. For example, a map 356 may be selected in response to an input brightness value (e.g., input brightness value 332) and be used to adjust input data (e.g., target brightness level 230 derived from image frame data) to generate output data (e.g., compensated programming voltages 236) for transmission to pixels 82.

It is noted that maps resulting from the luminance of the capture during calibration or map generation operations may be used to cause a relatively good compensation when the display 18 is to emit according to an input brightness value around the luminance of capture. However, when the same map is applied to a compensation associated with an input brightness value different (e.g., a threshold amount different) from the luminance of capture, the compensation quality may decrease. Since maps resulting from image captures at different luminance of capture values may be relatively optimal at different input brightness values, capturing two or more image captures and generating two or more maps may improve compensation operations of the display 18 when operating ranges are used to determine how to pair input brightness values with resulting maps. In this way, the map selected for use in a particular compensation operation may correspond to an operating range that a particular input brightness value is within, and thus the map and compensation operation may be better suited overall for the particular input brightness value. In this way, operational ranges may be defined for a particular display 18 and each of the operational ranges may correspond to one or more original image captures and a map (e.g., one map of the maps 330).

Figure 18:
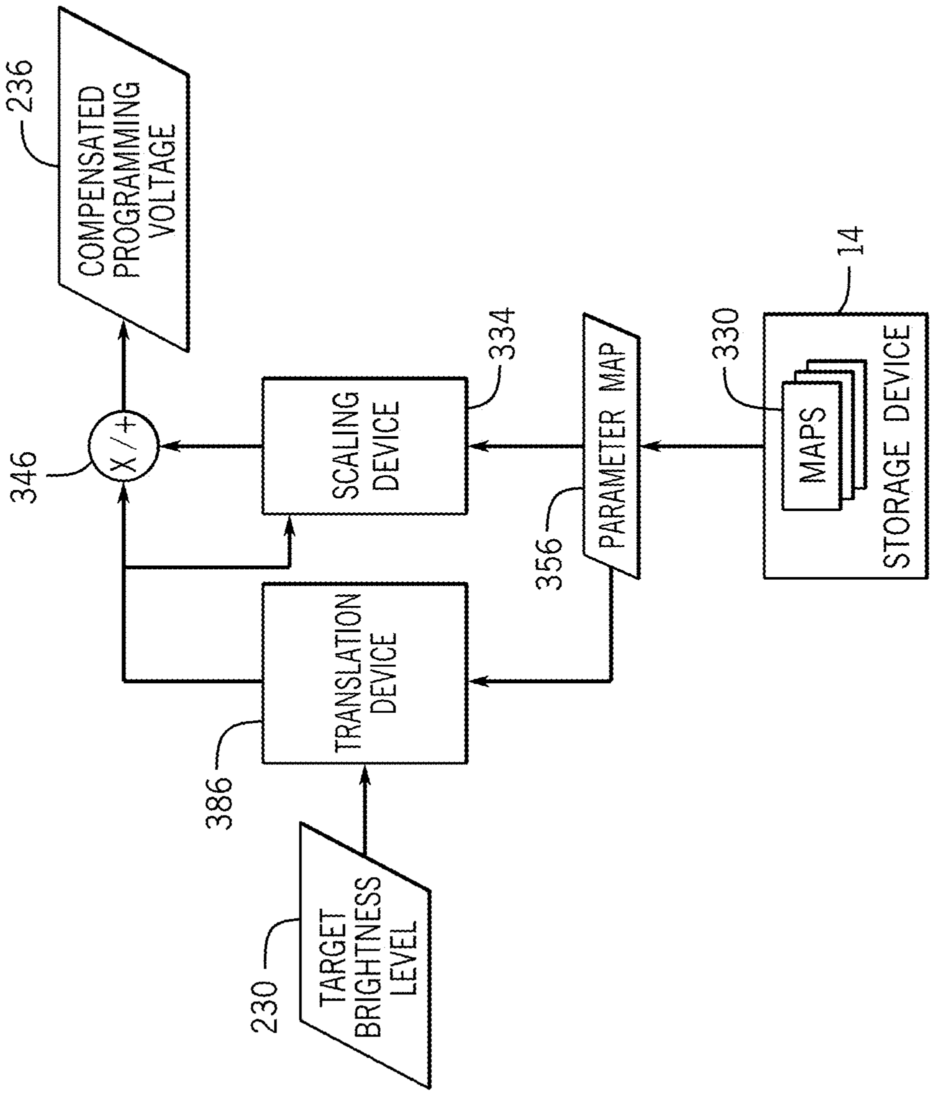
FIG. 18 is a block diagram illustrating a portion of the compensation systems of FIG. 15 and FIG. 16 that applies a per-pixel function to a target brightness level for a pixel, and scales the resulting programming voltage to generate a compensated programming voltage when compensating for non-uniform properties between pixels and crosstalk between pixels, in accordance with an embodiment.

Referring back to FIG. 15 and FIG. 16, operations of the scaling devices 334 may involve performance of a two-dimensional color scaling, where input data (e.g., target brightness levels 230) is adjusted (e.g., scaled) based at least in part on color components of the image frame to be presented and/or of an image frame previously presented. FIG. 18 is a block diagram illustrating a portion of the compensation system described in FIG. 15 and FIG. 16 that applies a per-pixel function to the target brightness levels 230 and scales the target brightness levels 230 to compensate for effects of crosstalk (e.g., crosstalk between regions of the display 18, pixels 82 of the display 18, crosstalk over time affecting a same pixel 82, sub-pixels of the pixels 82). It is noted that some of the systems and methods depicted in FIG. 18 have been described earlier, and descriptions of such are relied upon herein. Once the controller 84 selects the map 356 from the maps 330 (or masks the effects of the remaining maps 330 except for the map 356), the scaling device 334 may adjust the target brightness level 230 to generate the compensated programming voltage 236.

In some cases, one or more translation devices 386 may be included between an input receiving the target brightness levels 230 and the combination circuitry 346 to further translate the input data into data suitable for scaling and transmission to the pixels 82. For example, the translation devices 386 may use extracted parameters 234 identified by the map 356 to generate programming voltages to be output to the scaling device 334 for use in the generation of the compensated programming voltages. In this way, in some cases, the scaling device 334 may adjust programming voltages, image data indicative of programming voltages (e.g., data interpretable by a driver to generate one or more programming voltages), indications of target brightness levels, or any suitable data derived from image data corresponding to the image frame for presentation to generate the compensated programming voltages 236.

Additional scaling factors may be used to modify input data to compensate for pixel crosstalk between portions of the display 18, such as between regions of the display and/or between sub-pixels of a pixel 82 based on a display brightness value 332. Indeed, any of scaling factors may be determined during manufacturing of the display 18 and selected to improve uniformity of an image presented on the display 18 during testing. The scaling factors may be selected to cause the display 18 to present an image frame including a uniform image data (e.g., all one color) in a manner perceivable by a user as uniform and/or in a manner determined to be uniform. Since both the additional scaling factors (e.g., scaling based on the brightness value 332) and extracted parameters of the parameter maps 330 may change in response to the display 18 being used to present at different brightness levels, the parameter map 356 may include indications of the scaling factors.

The scaling device 334 determines the scaling factors from a parameter map 356 accessed from the storage device 14 based at least in part on a relationship stored in the scaling device 334. The relationship stored may apply adjustments and/or use input data in a computation to generate output data. For example, the scaling device 334 may apply the scaling factors to a stored relationship that scales a relative contribution of each portion of the display 18. The scaling device 334 may include components similar to electronic device 10, such as similar to the storage device 14, and thus relationships used to perform scaling operations may be stored in a storage device of the scaling device 334. In this example, the portion of the display 18 being scaled corresponds to sub-pixels of a pixel 82.

To elaborate, an image presented as an image frame may include multiple colors formed from emitted light. A pixel 82 may emit light from one or more sub-pixels that respectively emit light according to color components of a respective color to be emitted by the pixel 82 as a whole. For example, a pixel 82 may receive programming voltages (e.g., compensated programming voltages 236, non-compensated programming voltages) via one or more channels to drive emission of light from the pixel 82. Each channel may transmit to a portion of the pixel 82 (e.g., a sub-pixel), where each sub-pixel of the pixel 82 may include its own light emitting portion that is respectively driven relative to other sub-pixels and pixels 82 of the display 18.

Sub-pixels of a pixel 82 may be driven to emit light at different brightness levels to cause a user viewing the display 18 to perceive different colors of light. For example, to present a white light from the pixel 82 that includes a red sub-pixel, a green sub-pixel, and a blue sub-pixel, each sub-pixel may emit light according to a gray level of 255. However, to emit a green light from the pixel 82, the green sub-pixel may emit light according to a gray level of 255 while the red sub-pixel and the blue sub-pixel emit light according to a gray level of 0. It is noted that a variety of suitable red-blue-green (RBG) color combinations exist. Sub-pixels may also correspond to hue and/or luminance levels of a color to be emitted by the pixel 82 and/or to alternative color combinations, such as combinations that use cyan (C), magenta (M), or the like.

Referring back to the relationship, a contribution to the color emitted by the pixel 82 from each of the sub-pixels (and thus each of the channels of the pixel 82) may be increased and/or decreased based at least in part on a value of the scaling factors. In this way, the larger the respective scaling factor, the more of an influence the sub-pixel has on the emitted color from the pixel 82. In some cases, one or more of the scaling factors may be negative to counteract an effect of the respective sub-pixel on its own emitted light and/or on light emission of neighboring sub-pixel.

To elaborate further on the relationship, operations performed by the scaling device 334 may include adjustment of the input data (e.g., target brightness level 230 for a sub-pixel, generated programming voltages 236 for a sub-pixel) according to a relationship. However, it should be noted that any relationship may be implemented using the scaling device 334. Indeed, the scaling device 334 may perform a partial compensation to incoming image data (e.g., incoming target brightness levels 230, generated programming voltages 236) based at least in part on previous image data and/or the scaling factors.

An amount of correction applied to a first channel of input data (e.g., ΔR', an amount by which the target brightness level 230 corresponding to a first portion of the display 18 is adjusted) may be determined by the scaling device 334 by using the relationship. The amount of correction (ΔR') may be determined by multiplying a change in first channel input data (ΔR) (e.g., how much the target brightness level 230 for the first channel changed from a previous processing operation to the present processing operation) by a total sum of each scaled channel of image data for a respective pixel 82. For example, the pixel 82 may receive programming voltages from three channels (e.g., programming voltages for red channel corresponding to red sub-pixel, blue channel corresponding to blue sub-pixel, and green channel corresponding to green sub-pixel). The programming voltages may be or may be derived from image data (D). In this way, the programming voltages for the pixel 82 may correspond to a target brightness level 230 for the red channel ($D_R$), a target brightness level 230 for the green channel ($D_G$), and a target brightness level 230 image data for the green channel ($D_B$). However, when uniformity of an image presented by the display may improve (e.g., become relatively more uniform) by adjusting scaling associated with how much a particular channel contributes to the overall light perceived as emitted from the pixel 82, the scaling factors may adjust said contributions. The scaling factors (e.g., red channel-on-red channel scaling factor ($Gain_{scalingRR}$), green channel-on-red channel scaling factor ($Gain_{scalingGR}$), blue channel-on-red channel scaling factor ($Gain_{scalingBR}$)) may collectively compensate for pixel crosstalk affecting the red-channel of the pixel 82 by increasing or decreasing an overall amount of correction applied to image data being processed for presentation.

Similarly, an amount of correction applied to a second channel of input data (e.g., ΔG', the channel corresponding to the green sub-pixel) may be determined by multiplying a change in second channel input data (ΔG) by data to be transmitted to the pixel 82 via scaled channels (e.g., green channel-on-red channel scaling factor ($Gain_{scalingGR}$), green channel-on-green channel scaling factor ($Gain_{scalingGG}$), blue channel-on-green channel scaling factor ($Gain_{scalingBG}$)). The programming voltages may be shared between processing operations for a same pixel 82. In this way, a target brightness level 230 for the red channel ($D_R$), a target brightness level 230 for the green channel ($D_G$), and a target brightness level 230 image data for the green channel ($D_B$) may be used to determine a correction to apply to each respective channel (e.g., each respective sub-pixel). For example, an amount of correction applied to a third channel of input data (e.g., ΔB', the channel corresponding to the blue sub-pixel) may be determined by multiplying a change in second channel input data (ΔB) by data to be transmitted to the pixel 82 via the scaled channels (e.g., red channel-on-blue channel scaling factor ($Gain_{scalingRB}$), green channel-on-blue channel scaling factor ($Gain_{scalingGB}$), blue channel-on-blue channel scaling factor ($Gain_{scalingBB}$)).

In some cases, the amount of scaling applied using scaling factor pairs is the same between relationships while in other cases, the values differ. For example, in some cases, the red channel-blue channel pair may have a same scaling relationship, such as the red channel-on-blue channel scaling factor ($Gain_{scalingRB}$) may scale the blue channel the same amount as the blue channel-on-red channel scaling factor ($Gain_{scalingBR}$) scales the red channel. Additionally or alternatively, in some cases, the use of the scaling device 334 may be applied at low gray levels. In this way, the controller 84 may selectively activate the scaling device 334 in response to determining that one or more of the channels of the pixels 82 are expected to receive a respective target brightness level 230 equal to or less than a threshold brightness level. For example, the threshold brightness level may correspond to a 25% brightness level, such that the controller 84 may activate the scaling device 334 to adjust the red channel of a pixel 82 in response to determining that the pixel 82 is to emit according to a target brightness level of 20% of a maximum brightness level (e.g., less than the threshold brightness level). It is noted that the controller 84 may apply the relationship using firmware and/or software as opposed to using a dedicated scaling device 334, and thus may selectively apply the relationship in software and/or firmware in response to determining that the target brightness level 230 is equal to or less than the threshold brightness level.

Sometimes threshold brightness levels may be applied to a panel of display 18 regionally, such that some portions of the display 18 may have different threshold brightness levels relative to other portions of the display 18. This regionality may additionally or alternatively extend to the scaling factors, such that some regions of the display 18 may have higher or lesser adjustments made to the channels of the display 18. Furthermore, for an example pixel 82, the channels transmitting to the pixels 82 may be selectively scaled or not scaled. In this way, the controller 84 may scale one channel of the pixel 82 without scaling a second channel of the pixel 82. To skip scaling of the parameter map 356, the controller 84 may set scaling factors for all relationships to 1. To skip scaling of a respective channel, the controller 84 may set one or more scaling factors for the channel to 1.

Figure 19:
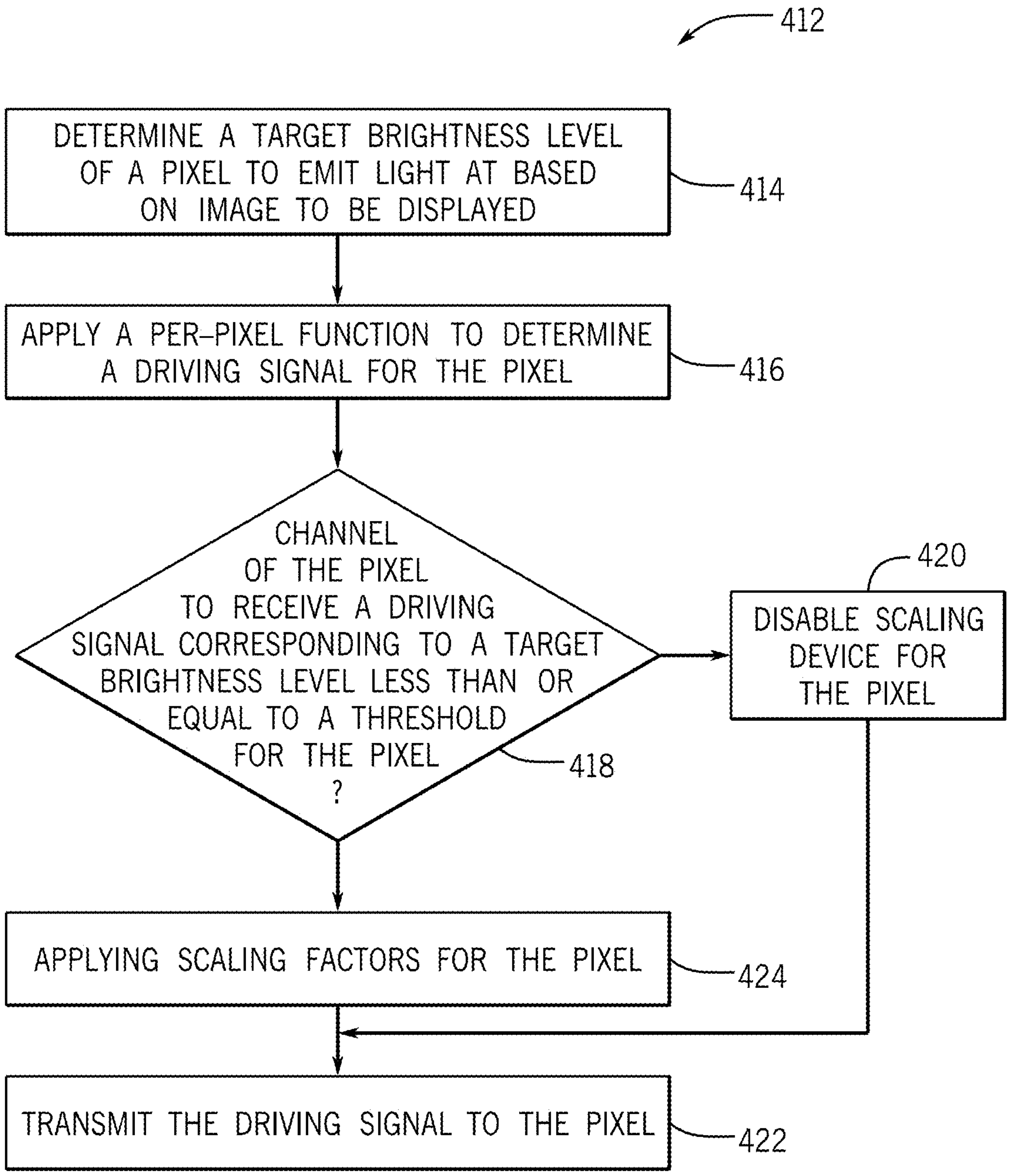
FIG. 19 is a flowchart of a process for applying a per-pixel function to compensate for pixel non-uniformities and to compensate for crosstalk between pixels, in accordance with an embodiment.

To help elaborate, FIG. 19 is a flowchart of a process 412 for performing the dynamic correction techniques associated with the per-pixel function 232 of FIG. 11 and the scaling device 334 of FIG. 18 that the controller 84 may follow in operating to correct for non-uniformities of the display 18 panel. The process 412 of FIG. 19 includes determining a target brightness level for a pixel to emit light at based on image to be displayed (block 414), applying a per-pixel function to determine a driving signal for the pixel (block 416), determining whether one or more channels of the pixel are to receive a driving signal corresponding to a target brightness level less than or equal to a threshold for the pixel (block 418), in response to determining that one or more channels of the pixel are to not receive a driving signal corresponding to a target brightness level less than or equal to the threshold for the pixel, disabling a scaling device (block 420), and transmitting the driving signal to the pixel (block 422). In response to determining that one or more channels of the pixel are to receive a driving signal corresponding to a target brightness level less than or equal to the threshold for the pixel (block 418), applying scaling factors to the pixel via the scaling device (block 424), and transmitting the driving signal to the pixel (block 422). It should be understood that, although the process 412 is described herein as being performed by the controller 84, any suitable processing circuitry, such as the processing core complex 12 or additional processing circuitry internal or external to the display 18, may perform all or some of the process 412. It should also be understood that the process 412 may be performed in any suitable order, including an order other than the described order below, and may include additional steps or exclude any of the described steps below.

At block 414, the controller 84 determines a target brightness level 230 for a pixel 82 to emit light at based on an image to be displayed. This may be similar to operations performed at block 262 of FIG. 12. The controller 84 may determine a target brightness level 230 for a pixel 82 to emit light at based on image data. The target brightness level 230 may correspond to a gray level associated with a portion of the image data assigned to the pixel 82. The controller 84 uses the target brightness level 230 to determine a compensated programming voltage 236 to use to drive the pixel 82. A proportion associating the gray level indicated by the image data to a target brightness level, or any suitable function, may be used in determining the target brightness level 230. In some cases, the pixel 82 receives multiple channels of image data. In this cases, the controller 84 generates target brightness levels 230 for each channel to be transmitted to the pixel 82.

At block 416, the controller 84 applies the per-pixel function 232 to the target brightness levels 230 for the pixel 82 to determine one or more compensated programming voltages 236. The controller 84 determines one or more compensated programming voltages 236 for the pixel 82 based on the target brightness level 230 and based on the extracted parameters 234. The extracted parameters 234 are used to predict the particular response of the pixel 82 to the various programming voltages that may be applied (e.g., the per-pixel function 232 for that pixel 82). Thus, based on the per-pixel function, the controller 84 determines the compensated programming voltages 236 to apply to cause the pixel 82 to emit at the target brightness levels 230, or a compensation to make to a programming voltage to be transmitted to the pixel 82 (e.g., such as in cases where each pixel 82 to emit at the target brightness level 230 receives the same programming voltage that is later changed before being used to drive a pixel 82 based on the per-pixel function 232 for the pixel 82). It should be noted that although described as a programming voltage, the compensated programming voltages 236 may be any suitable data signal used to change a brightness of light emitted from the pixel 82 in response to image data. For example, the controller 84 may determine and/or generate a control signal used to change a data signal, such as programming voltages, to generate a compensated data signal to be delivered to the pixel 82.

At block 418, the controller 84 may determine whether a channel of the pixel 82 is to receive a driving signal corresponding to a target brightness level 230 less than or equal to a threshold for the pixel 82. The determination at block 418 may be performed in response to the controller 84 trying to determine whether to scale one or more channels of the pixel 82, where crosstalk between channels of the pixel 82 and/or between portions of the display 18 may be relatively more apparent at lower gray levels.

In response to determining at block 418 that no channel of the pixel 82 is to receive a driving signal corresponding to a target brightness level (e.g., target brightness level 230) less than or equal to a threshold for the pixel 82, the controller 84 may, at block 420, disable the scaling device 334 (or a portion of the scaling device 334 responsible for compensation for the pixel 82) such that channels of the pixel 82 are not adjusted and/or compensated. This may involve setting one or more of the scaling factors to a single value, such as 0 or 1. This may additionally or alternatively involve setting an output of the scaling device 334 corresponding to the pixel 82 to 0 or 1. The setting of the scaling device 334 and/or the setting of the scaling factors may be based at least in part on the addition/multiplication operation of the combination circuitry 346. In this way, outputs of the scaling device 334 may be set to 0 when the combination circuitry 346 adds the output from the scaling device 334 and the input data (e.g., target brightness level 230, programming voltage 236). In some cases, outputs of the scaling device 334 may be set to 1 when the combination circuitry 346 multiplies the outputs from the scaling device 334 and the input data (e.g., target brightness level 230, programming voltage 236).

Using the outputs from the combination circuitry 346, at block 422, the controller 84 may transmit further compensated programming voltages (referred to herein as compensated programming voltages 236 for ease of reference) to the pixel 82 by operating a driver 86 of the display 18 to output the compensated programming voltage 236 levels to the pixel 82. The compensated programming voltages 236 may cause the pixel 82 to emit light at the target brightness level 230. Thus, through the controller 84 transmitting the compensated programming voltages 236 to the pixel 82, visual artifacts of the display 18 are reduced via correction and compensation for non-uniform properties between pixels 82.

Referring back to block 418, in response to determining that one or more channels of the pixel 82 are to receive a driving signal corresponding to a target brightness level (e.g., target brightness level 230) less than or equal to a threshold for the pixel 82, the controller 84 may, at block 424, apply scaling factors to the scaling device 334 (or a portion of the scaling device 334 responsible for compensation for the pixel 82) such that channels of the pixel 82 are able to be respectively adjusted and/or compensated based at least in part on the scaling factors. This may involve setting one or more of the scaling factors to any suitable data value. Adjusted outputs from the scaling device 334 may be combined with input data (e.g., target brightness level 230, programming voltage 236) at the combination circuitry 346 to generate further compensated programming voltages (e.g., compensated programming voltage 236). The compensated programming voltages 236 may then be transmitted to pixel 82 as the driving signals, at block 422, to cause the pixel 82 to emit light in response to the driving signals. Thus, through the controller 84 transmitting the compensated programming voltages 236 to the pixel 82, visual artifacts of the display 18 are reduced via correction and compensation for non-uniform properties between pixels 82, including visual artifacts caused at least in part by temporal crosstalk and/or spatial crosstalk between channels of the pixel 82 and/or between regions of the display 18.

Figure 20:
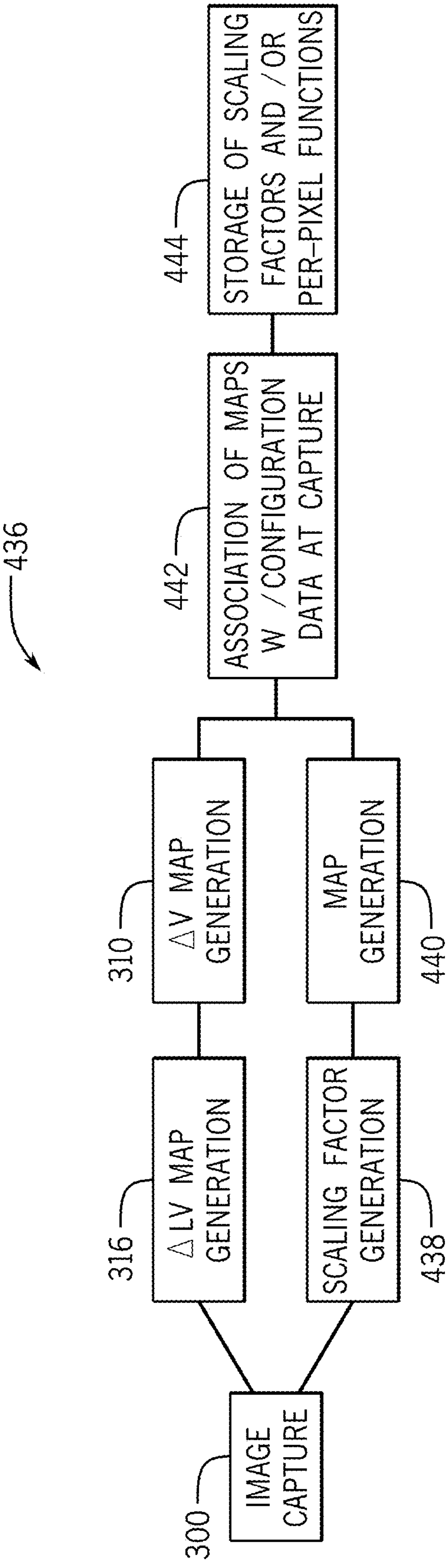
FIG. 20 is a block diagram illustrating operations used by a calibration system to generate per-pixel functions for the display of FIG. 1, in accordance with an embodiment.

Scaling factors may be selected during a calibration process for the display 18 during manufacturing of the display 18. To help elaborate on how scaling factors are generated, FIG. 20 is a block diagram illustrating operations 436 used by a calibration system when generating per-pixel functions for a display 18 that derived from an image (e.g., image capture operations 300). As described above, the per-pixel functions may be used when compensating for non-uniform properties and/or crosstalk between pixels 82, between regions of pixels 82, and/or between channels of pixels 82 (e.g., channels of a pixel 82, channels of multiple pixels 82). The calibration system may include components similar to the electronic device 10. In this way, the processing core complex 12 of the calibration system may determine per-pixel functions (e.g., one or more per-pixel functions 232) from an image captured of the display 18 while operated at a particular input brightness value and/or at particular configuration settings (e.g., refresh rate, ambient temperature, operating temperature) as part of image capture operations 300. The image captured may correspond to an image resulting from uniform image data presented on the display 18. When pixels 82 of the display 18 have non-uniform properties and/or experience crosstalk, an otherwise uniform set of image data may present as non-uniform. The operations 436 are performed to determine settings and/or parameters to use to adjust the image data to cause the display 18 (at a later time) to present the same image data as relatively more uniform when the same image data is adjusted prior to presentation.

In this way, the image captured during the image capture operations 300 may be used to generate one or more maps (e.g., during electronic device 10 manufacturing and/or calibration) to be used for image data compensation. For example, image data of the image captured via the image capture operations 300 may be used to generate a change in brightness map (e.g., ΔLv map via ΔLv map generation operations 316) and to generate, from the ΔLv map, a change in voltage map (AV map). Furthermore, the image data of the image captured via the image capture operations 300 may be used to generate scaling factors (e.g., scaling factor generation operations 438).

When generating the scaling factors, the processing core complex 12 of the calibration system may update intra-color scaling weights at least in part by scaling respective channels of one or more pixels 82. The processing core complex 12 of the calibration system may set some of the scaling factors to 0, 1, and/or negative values to achieve a suitable compensation. The scaling factors may be selected by the processing core complex 12 of the calibration system to adjust the captured image of the image capture operations to present on the display as a uniform color.

In some cases, the scaling factors corresponding to a particular input brightness value and/or the per-pixel functions 232 based on the ΔV map may be relatively less accurate as the input brightness value of the display 18 at a time of compensation (e.g., during operation rather than manufacturing and/or calibration) deviates from the input brightness value of the display 18 at a time of the image capture operations 300 (e.g., during manufacturing and/or calibration). Generating several maps 330, each at differing input brightness levels, may help improve compensation operations since the controller 84 is able to retrieve the map suitable for brightness level at a time of compensation when adjusting data signals for the pixels 82.

For example, several maps 330 may be generated at different brightness levels during map generation operations 310, 316, 440. Later, a map 356 from the several maps 330 may be selected based on real-time operating conditions (e.g., brightness levels at a present time). For example, a map 356 may be selected in response to an input brightness value and be used to derive a per-pixel function 232 associated with both a particular pixel 82 and the real-time operating condition. Selecting the map 356 in response to a present input brightness level or ongoing screen brightness may improve compensation operations since this operation permits a desired map 356, or a map calibrated for the particular input brightness level, to be used for compensation operations when the particular input brightness level is to be used. It is noted that in some cases, the map 356 selected may be further processed after selection and/or in preparation for application to input image data to improve compensation operations.

When using maps 330, the scaling factors and/or the per-pixel functions 232 may be associated with different input brightness values at association operations 442. Thus, scaling factors and/or per-pixel functions 232 determined for a respective input brightness value (or range of input brightness values) may be saved in storage device 14 of the electronic device 10 as related and/or associated at storage operations 444. After storage of the maps 330, the controller 84 may be able to access the maps 330 when determining how to adjust incoming image data to be presented at the respective input brightness value.

In some cases, the operations 436 may be iterative. In these cases, the processing core complex 12 of the calibration system may repeat determinations of the maps 330 at particular configurations of the display 18 of the electronic device 10 to try to determine an optimal and/or relatively best combination of scaling factors and/or per-pixel functions 232. For example, the controller 84 may perform a curve-fitting operation to determine the per-pixel functions 232, and may test a curve-fitting result to determine an adjustment to the per-pixel functions 232 to improve the representation of the capture image in a respective per-pixel function 232. The per-pixel function may be, for example, a linear regression, a power law model (e.g., current or brightness equals power multiplied by a voltage difference exponentially raised by an exponent constant representative of the slope between voltages), an exponential model, or the like. Furthermore, the processing core complex 12 of the calibration system may perform first a larger correction to channel before performing a smaller correction to the channel, such as to perform relatively more efficient determination operations.

The iterative determinations of the maps 330 may additionally or alternatively include checking an over-correction impact and/or an under-correction impact. For example, at a particular target brightness level, there may be one or more correction impact target ranges and/or correction image thresholds (e.g., over-correction impact target range, over-correction impact threshold, under-correction impact target range, under-correction impact threshold) that define parameters for the processing core complex 12 of the calibration system to meet or satisfy when determining the maps 330. Adjustments made to the combination of scaling factors and/or per-pixel functions 232 may be made with consideration for the correction impact target ranges and/or correction image thresholds, and keeping amounts of correction impacts within the parameters. In this way, the processing core complex 12 of the calibration system may determine when and/or how many times a resulting combination of scaling factors and/or per-pixel functions 232 results in an over-correction (e.g., arrow 372) and/or results in an under-correction (e.g., arrow 370) to guide optimization and/or determination of the maps 330.

In some cases, the threshold used to determine when a correction is an over-correction or an under-correction may correspond to an average pixel behavior of the display 18 and/or corner cases (e.g., extreme parameter possibilities) for the display 18. An example corner case may correspond to maximum or minimum gray levels for the display 18. Consideration of corner cases may help future corrections be relatively more conservative of parameter settings. Furthermore, in some cases, the maps 330 are determined in response to driving the display 18 to present a completely white image (e.g., white check for the display 18 corresponding to each gray level equaling 255 for each channel) and/or a complete black image (e.g., gray level equal to 0 for each channel). The maps 330 may be determined based on a white image or a black image to calibrate a base line of the display 18.

Referring back to image capture operations 300, sometimes configuration data gathered at time of image capture operations 300 may include an indication of refresh rate of the display 18 and/or temperature of the display 18. The refresh rate and/or temperature of the display 18 at the time of image capture operations 300 may be associated with the generated map of the maps 330 also at association operations 442 and/or stored in a separate data object (e.g., look-up table, data table) in storage device 14 to be retrieved when adjusting image data.

Figure 21:
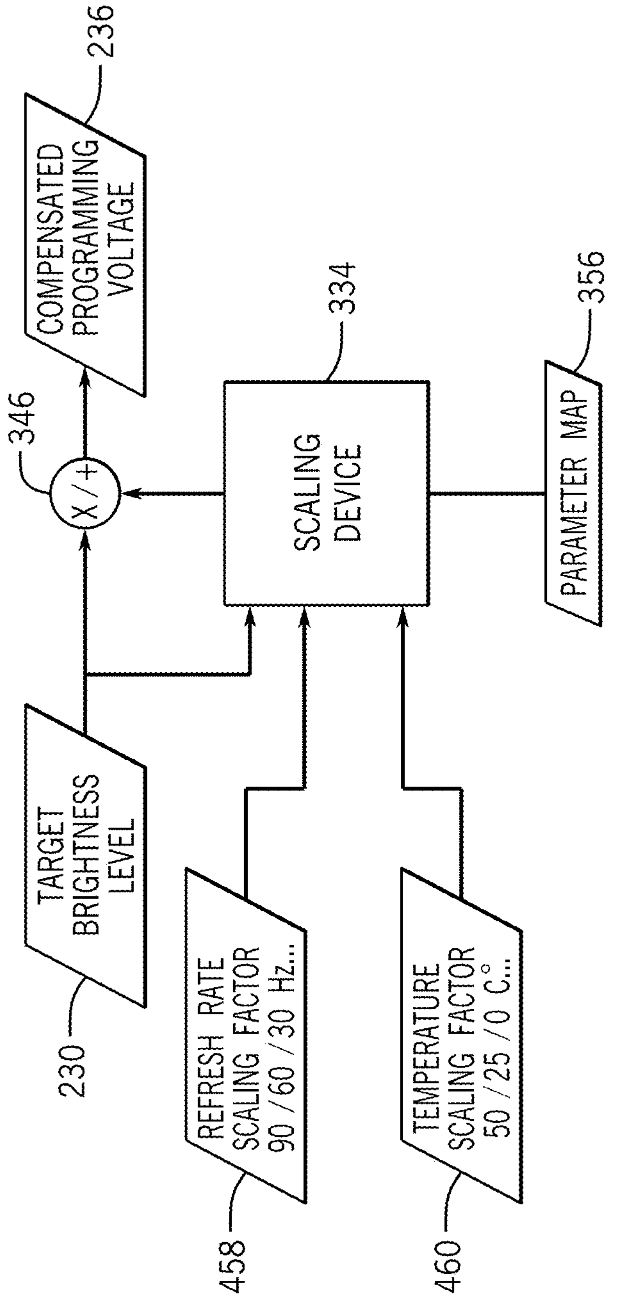
FIG. 21 is a block diagram illustrating another example of the compensation system of FIG. 18 that considers refresh rates and/or temperatures when compensating for non-uniform properties between portions of the display of FIG. 1, in accordance with an embodiment.

For example, FIG. 21 is a block diagram illustrating a portion of the compensation system described in FIG. 15 and FIG. 16 that applies a per-pixel function to the target brightness levels 230, or other suitable input data, and scales the target brightness levels 230, or other suitable input data, to compensate for effects of crosstalk (e.g., crosstalk between regions of the display 18, pixels 82 of the display 18, crosstalk over time affecting a same pixel 82, sub-pixels of the pixels 82) based on scaling factors from the map 356 and refresh rate scaling factor 458 and/or temperature scaling factor 460. It is noted that some of the systems and methods depicted in FIG. 21 have been described earlier, and descriptions of such are relied upon herein. Once the controller 84 selects the map 356 from the maps 330 (or masks the effects of the remaining maps 330 except for the map 356), the scaling device 334 may adjust the target brightness level 230 to generate the compensated programming voltage 236 based on the scaling factors, the refresh rate scaling factor 458, and/or the temperature scaling factor 460.

For example, the scaling device 334 may use relationships that consider effects of refresh rate and/or temperature on presentation of images on the display 18 to adjust the cross-channel interference effects of the display 18. In each relationship, the amount of correction applied to a respective channel of input data (e.g., channel corresponding to the red sub-pixel (AR'), channel corresponding to the green sub-pixel (AG'), channel corresponding to the blue sub-pixel (AB')) may be multiplied by a refresh rate scaling factor 458, and/or a temperature scaling factor 460. The refresh rate scaling factor 458 and/or a temperature scaling factor 460 may be determined during operations 436, such as during the scaling factor generation operations 438.

It is noted that the scaling device 334 may compensate for the refresh rate or temperature, or both, for a next image frame to be presented on the display. For cases where the scaling device 334 is considering the refresh rate or temperature, the other scaling factor may be set to 1 by the controller 84 and/or scaling device 334. For example, when the scaling device 334 considers refresh rate without temperature, the relationship may be suitably adjusted to include the refresh rate scaling factor 340 and may set the temperature scaling factor to 1 in the relationship.

Figure 22:
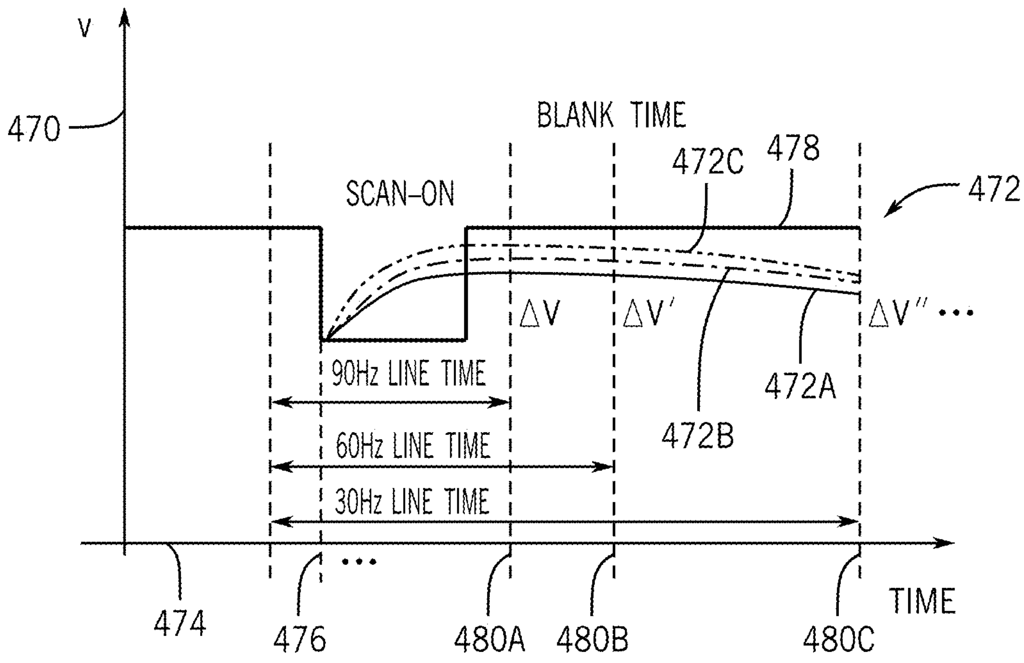
FIG. 22 is a graph of voltage of a pixel over time that highlights what effect variable refresh rates may have on performance of the display of FIG. 1, in accordance with an embodiment.

FIG. 22 is a graph of voltage (axis 470) of a pixel 82 (e.g., lines 472) over time (axis 474) to show an effect that a variable refresh rate may have on performance of the display 18. When a refresh rate changes from, for example, 90 Hertz (Hz) to 60 Hz or 30 Hz, a line time may increase. The line time increasing may cause a time between activation (e.g., time 476) of a scan control signal (e.g., line 478) and a blank time (e.g., time 480A for 90 Hz, time 480B for 60 Hz, time 480C for 30 Hz) for the display 18 to increase. When a blank time increases beyond a threshold of the display 18, changes in voltages of the display 18 may be perceivable to a viewer, who interprets the changes in the voltages as a visual artifact. For example, when a voltage decreases too low, such as may be the case with the refresh rate of 30 Hz, the user may perceive this change in voltage as a visual artifact.

When operating the scaling device 334 and/or the controller 84 to compensate for changes in refresh rate, perceivable changes in voltages caused by the change in refresh rate may be reduced or eliminated. In this way, driving the display 18 according to programming voltages 236 determined at least in part on relationships may improve a perceivable quality of an image presented on the display 18.

Figure 23:
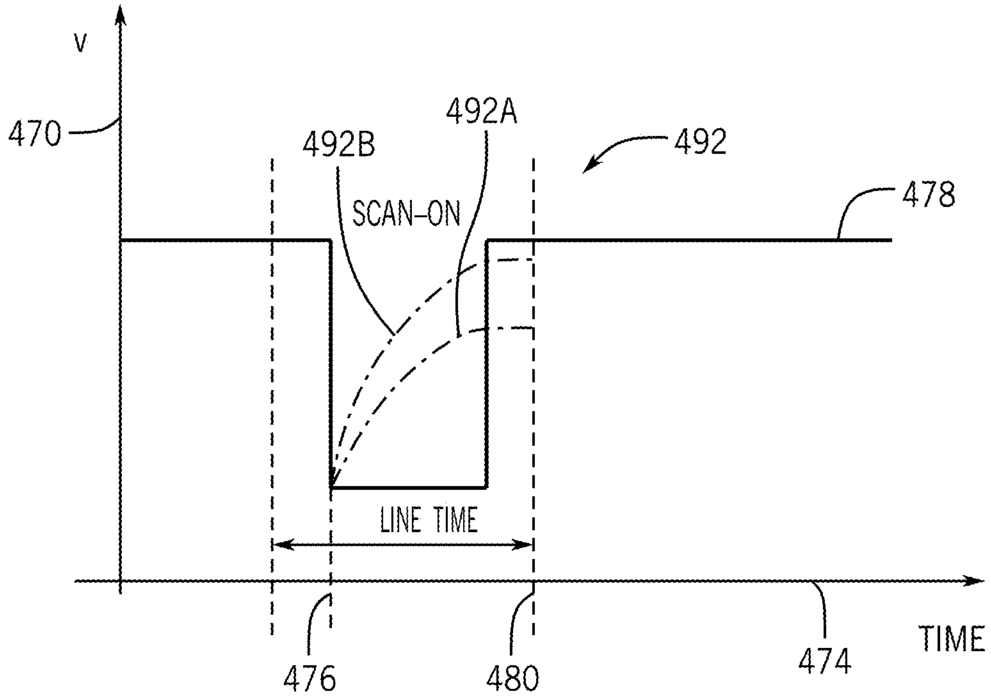
FIG. 23 is a graph of voltage of a pixel over time that highlights what effect temperature may have on performance of the display of FIG. 1, in accordance with an embodiment.

Additionally or alternatively, FIG. 23 is a graph of voltage (axis 470) of a pixel 82 (e.g., lines 492) over time (axis 474) to show an impact that a variable temperature may have on performance of the display 18. When a temperature changes from, for example, a first temperature (T1) to a second temperature (T2), voltage behaviors of a same pixel 82 change which may affect a voltage of the pixel 82 at a blank time 480. It is noted that line 492A and line 492B are superimposed to have a same time 476 of activation of the scan control signal to highlight effects on voltage at blank time 480 when the temperature is variable between line times for the pixel 82. When a voltage at or before the blank time 480 increases or decreases beyond a threshold of the display 18, changes in voltages of the display 18 may be perceivable to a viewer, who may interpret the changes in the voltage as a visual artifact. For example, when a voltage decreases too low, such as may be the case with variable temperature conditions of the display 18, the user may perceive this change in voltage as a visual artifact.

It is noted that the controller 84 may operate similarly to the process 412 of FIG. 19 when adjusting image data for the pixel 82 with consideration for refresh rate and/or temperature associated with a next image frame. However, when operating in this manner, an additional operation may be included with the process 412 that causes the scaling device 334 to receive additional scaling factors associated with the present refresh rate and/or present temperature such that those considerations may be made. It is also noted that at the block 422 and block 424, the controller 84 may additionally determine whether a change in refresh rate or temperature occurred, and if a change occurred, the controller 84 may transmit scaling factors to the scaling device 334 to adjust presentation of the next image to compensate for the changes (e.g., by applying the additional scaling factors).

As described above, in some cases, the per-pixel functions 232 may be applied to regions of pixels, such that a region of pixels 82 is referenced by a same function (e.g., per-group-of pixels functions). These regionally-defined functions may be applied in a similar manner as the relationships described above, and thus may be scaled accordingly. In some cases, per-region functions (e.g., per-group-of-pixels functions) may help compensate for region-to-region crosstalk (e.g., region-to-region interference) and a use of scaling to adjust data transmitted to respective pixels 82 within the region based on the region-wide definition (e.g., per-region function) may help reduce or eliminate effects of the region-to-region crosstalk. Additionally or alternatively, scaling factors (e.g., refresh rate scaling factors 340, temperature scaling factors 342) may be applied to regions of pixels 82 and/or respective pixels 82. Furthermore, in some cases, a threshold may be used to define when a regional function is to be referenced and/or when a per-pixel function 232 is to be referenced. For example, there may be a particular display brightness value 332 where above the value, an example pixel 82 is compensated with neighboring pixels 82 and below the value, the example pixel 82 is compensated independent of the neighboring pixels 82. The same thresholding process may be applied to refresh rate scaling factor 340 and/or temperature scaling factors 342. For example, below a threshold (e.g., threshold brightness value 332, threshold target brightness level 230)), a pixel may be compensated using a global and/or region scaling factor and while above the threshold, the pixel may be compensated according to a respective scaling factor. As another example, above a threshold, the pixel 82 may be adjusted by a global (or regional) refresh rate scaling factor 340 and by a respective temperature scaling factor 342, while below the threshold the pixel 82 may be adjusted by a respective refresh rate scaling factor 340 and adjusted by a global (or regional) temperature scaling factor 342. Any suitable combination may be used, including a lack of application of scaling factor. In this way, sometimes a region of pixels 82 may be adjusted using a refresh rate scaling factor 340 without using a temperature scaling factor 342, or vice versa. These examples are not intended to be limiting and provide a mere subset of example combinations of scaling operations described herein.

Thus, the technical effects of the present disclosure include improving controllers of electronic displays to compensate for non-uniform properties between one or more pixels or groups of pixels, for example, by applying a per-pixel function to programming data signals used in driving a pixel to emit light. These techniques describe selectively generating a compensated data signal (e.g., programming voltage, programming current, programming power) based on a per-pixel function, where the compensated data signal is used to drive a pixel to emit light at a particular brightness level to account for specific properties of that pixel that are different from other pixels. These techniques may be further improved by generating compensated data signals with consideration for an input brightness value, refresh rates and/or temperatures. By selecting a map based on the input brightness value and scaling the map according to scaling factors, non-uniform properties of the display (including those caused by crosstalk between pixels or channels) that manifest as visual artifacts may be reduced or mitigated. Different maps may be generated at a time of calibration and/or manufacturing by repeating, at different brightness values, generation of extracted parameters for multiple image captures as a way to gather information about how each pixel behaves when driven to present at different brightness values in addition to different image data. Maps may be generated to include per-pixel functions and/or to include anchor points. Furthermore, using anchor points to provide a compensated data signal may further decrease an amount of time for compensation operations and/or may reduce an amount of memory used to store information used in the compensation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:

an electronic display panel comprising a plurality of pixels, wherein each pixel is configured to emit light based at least in part on a respective programming signal applied to the pixel;

a memory configured to store a plurality of maps comprising a first map, and wherein the first map comprises indications of respective pixel brightness-to-data relationships defined via a plurality of variables; and processing circuitry configured to:

receive an input brightness value corresponding to a global brightness value of the electronic display panel, wherein the input brightness value changes based at least in part on an ambient lighting condition;

determine to select the first map from the plurality of maps based at least in part on the input brightness value;

retrieve the first map based at least in part on the determination to select the first map;

determine a function for each pixel to generate a plurality of functions, wherein each function of the plurality of functions is defined via respective variables of the plurality of variables of the first map;

determine a plurality of control signals upon which the respective programming signal for each pixel is based, wherein the processing circuitry is configured to determine each respective control signal based at least in part on the function for each pixel;

determine a scaling factor based at least in part on the first map; and scale at least a subset of the plurality of control signals based at least in part on the scaling factor.

2. The system of claim 1, wherein the function is specific to each pixel based at least in part on different values of the plurality of variables compensating spatial crosstalk, temporal crosstalk, or both between one or more portions of the electronic display panel.

3. The system of claim 2, wherein the function comprises a power law model.

4. The system of claim 1, wherein each pixel comprises a light-emitting diode (LED).

5. The system of claim 1, wherein the processing circuitry is configured to:

scale at least an additional subset of the plurality of control signals based at least in part on a refresh rate scaling factor; and transmit the plurality of control signals to the electronic display panel for presentation after scaling the subset of the plurality of control signals and the additional subset of the plurality of control signals.

6. The system of claim 1, wherein the subset of control signals corresponds to a single color channel from a plurality of color channels.

7. The system of claim 1, wherein the plurality of variables of the first map stored in the memory are based at least in part on captured image data indicating brightness levels of light emitted by the plurality of pixels in response to test image data and a brightness level.

8. The system of claim 1, wherein scaling the subset of the plurality of control signals includes adjusting target brightness levels, adjusting programming voltage levels, adjusting programming voltage control signals, or any combination thereof.

9. The system of claim 1, wherein the processing circuitry is configured to determine the scaling factor based at least in part on the first map, a target brightness level, a refresh rate of the electronic display panel, an ambient temperature of the electronic display panel, and one or more color components of an image frame.

10. The system of claim 1, wherein the processing circuitry is configured to adjust the format of the first map at least in part by generating the plurality of variables of the first map based at least in part on decompressing the first map.

11. The system of claim 1, wherein the function is specific to each pixel based at least in part on different values of the plurality of variables compensating spatial crosstalk and temporal crosstalk between one or more portions of the electronic display panel.

* * * * *